(12) United States Patent
Yamaguchi et al.

(10) Patent No.: US 10,438,127 B2
(45) Date of Patent: *Oct. 8, 2019

(54) IN-HOME-PRESENCE PROBABILITY CALCULATION METHOD, SERVER APPARATUS, AND IN-HOME-PRESENCE PROBABILITY CALCULATION SYSTEM

(71) Applicant: PANASONIC INTELLECTUAL PROPERTY MANAGEMENT CO., LTD., Osaka (JP)

(72) Inventors: Takahiro Yamaguchi, Osaka (JP); Koichi Kusukame, Nara (JP); Shinichi Shikii, Nara (JP); Motoji Ohmori, Osaka (JP); Takako Hirose, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/173,362

(22) Filed: Oct. 29, 2018

(65) Prior Publication Data

US 2019/0065980 A1    Feb. 28, 2019

Related U.S. Application Data

(63) Continuation of application No. 14/543,015, filed on Nov. 17, 2014, now Pat. No. 10,157,345.

(30) Foreign Application Priority Data

Nov. 21, 2013 (JP) .................................. 2013-241219

(51) Int. Cl.
*G06N 7/00* (2006.01)
*G05B 15/02* (2006.01)
(Continued)

(52) U.S. Cl.
CPC ............. *G06N 7/005* (2013.01); *G05B 15/02* (2013.01); *H04L 12/2803* (2013.01); *H04L 12/6418* (2013.01)

(58) Field of Classification Search
CPC .. F24F 11/30; F24F 11/62; F24F 11/58; F24F 11/46; G05B 15/02; G06N 20/00; G06N 7/005
See application file for complete search history.

(56) References Cited

U.S. PATENT DOCUMENTS 8,457,796 B2 *  6/2013  Thind .................... G05B 15/02
                                                   236/47
8,510,255 B2 *  8/2013  Fadell ................... G05B 15/02
                                                   706/52
(Continued)

FOREIGN PATENT DOCUMENTS

JP        2012-181789        9/2012
JP        2013-092846 A      5/2013

OTHER PUBLICATIONS

Ardakanian et al., Markovian models for home electricity consumption, 6 pages (Year: 2011).*
(Continued)

*Primary Examiner* — Thuy Dao
(74) *Attorney, Agent, or Firm* — Greenblum & Bernstein, P.L.C.

(57) ABSTRACT

A management method manages devices in a home includes, receiving operation information on one of the devices when an operation is performed for the one of the devices, specifying times at which the operation was performed, in accordance with the information, and receiving, whenever a state is entered when no one is expected to be home, time information when the state has been entered. Specifying in-home-absence times at which a state has been entered when no one is expected to be home, according to the time (Continued)

information, for each of the devices, calculating time differences for the specified operation times, and for each of the devices, specifying the performed operation as a first behavior of the person correlated to a behavior before the person leaves home, when variation of the calculated time differences of the corresponding one of the devices is equal to or lower than a threshold.

10 Claims, 24 Drawing Sheets

(51) Int. Cl.
*F24F 11/00* (2018.01)
*H04L 12/28* (2006.01)
*H04L 12/64* (2006.01)

(56) References Cited

U.S. PATENT DOCUMENTS

| | | | |
|---|---|---|---|
| 8,583,585 B2 | 11/2013 | Ghanadan | |
| 9,176,485 B2* | 11/2015 | Krumm | G05B 15/02 |
| 9,189,751 B2 | 11/2015 | Matsuoka | |
| 9,298,197 B2* | 3/2016 | Matsuoka | G05D 23/1917 |
| 9,411,327 B2* | 8/2016 | Park | G05B 15/02 |
| 9,513,642 B2* | 12/2016 | Rogers | G05D 23/1904 |
| 9,804,578 B2* | 10/2017 | Deilmann | H04L 12/2827 |
| 9,810,442 B2* | 11/2017 | Matsuoka | G05D 23/1904 |
| 2010/0235004 A1* | 9/2010 | Thind | G05B 15/02 700/277 |
| 2012/0066168 A1 | 3/2012 | Fadell | |
| 2013/0325787 A1 | 12/2013 | Gerken | |
| 2014/0058572 A1 | 2/2014 | Stein | |
| 2014/0101082 A1* | 4/2014 | Matsuoka | H04L 12/2829 706/12 |
| 2014/0172176 A1 | 6/2014 | Deilmann | |
| 2014/0316584 A1 | 10/2014 | Matsuoka | |
| 2015/0280936 A1* | 10/2015 | Bishop | G08C 17/02 700/275 |
| 2015/0286948 A1* | 10/2015 | Luca | G05B 15/02 706/48 |

OTHER PUBLICATIONS

Barbato et al., Home energy saving through a user profiling system based on wireless sensors, 6 pages (Year: 2009).
Atftab et al., Smart air-conditioning control by wireless sensors: an online optimization approach, 12 pages (Year: 2013).

* cited by examiner

FIG. 10

| PERSON NAME (1010) | PERSON ID (1020) | ELECTRIC LOCK ID (1030) | DEVICE ID (1040) | ALWAYS-ON FLAG (1050) |
|---|---|---|---|---|
| ⋮ | ⋮ | ⋮ | ⋮ | ⋮ |
| MR. A | 11223344 | 98765 | T98-zyx987 (TELEVISION) | 0 |
| | | | R12-abc123 (REFRIGERATOR) | 1 |
| | | | W34-lmn321 (MICROWAVE) | 0 |
| | | | V65-aaa234 (RECORDER) | 0 |
| | | | D78-bbb678 (DRYER) | 0 |
| | | | ⋮ | ⋮ |
| MR. B | 12341234 | 56789 | A22-opq333 (AIR CONDITIONER) | 0 |
| | | | ⋮ | ⋮ |
| ⋮ | ⋮ | ⋮ | ⋮ | ⋮ |

1000

IN-HOME-PRESENCE PROBABILITY CALCULATION METHOD, SERVER APPARATUS, AND IN-HOME-PRESENCE PROBABILITY CALCULATION SYSTEM This is a continuation application of U.S. application Ser. No. 14/543,015, filed on Nov. 17, 2014, which claims the benefit of Japanese Patent Application No. 2013-241219, filed on Nov. 21, 2013, the entire disclosure of each of the above-identified applications, including the specification, drawings, and claims, is incorporated herein by reference in its entirety.

BACKGROUND

1. Technical Field

The present disclosure relates to an in-home-presence probability calculation method, a server apparatus, and an in-home-presence probability calculation system for calculating a probability that a person is at home.

2. Description of the Related Art

In the case where a delivery company or the like delivers a package that needs to be handed to a resident of a delivery destination, when the resident is not at home, the delivery company may need to once bring the package back to an office or the like.

When such a case occurs, a process for delivering the package and a process for bringing the package back to the office are futile and the delivery operation cost increases.

If it is possible to predict with great accuracy whether or not a person is at home, a delivery destination, at a delivery expected time of a package, the occurrence of such a case may be reduced.

Thus, a technology is desired that makes it possible to calculate with great accuracy an in-home-presence probability that a person is at home, where is a specific place, at a specific time.

For example, Japanese Unexamined Patent Application Publication No. 2012-181789 has described a technology in which an electric power company creates an over-time profile of the total amount of power used in a home over the last 365 days by recording changes in the total amount of power used in the home and creates an in-home-presence probability table of the home indicating in-home-presence probabilities obtained at certain time intervals in accordance with the created over-time profile.

SUMMARY

An in-home-presence probability calculation method according to the present disclosure is an in-home-presence probability calculation method used in an in-home-presence probability calculation system that provides information as to whether or not a person is at home. The in-home-presence probability calculation method includes receiving operation information on a device arranged in a home via a network every time a certain operation is performed for the device, specifying operation times at which the certain operation has been performed, in accordance with the received operation information, receiving, every time a state is entered in which it is expected that no one is at home, time information of a time at which the state has been entered, specifying in-home-absence times at which a state has been entered in which it is expected that no one is at home, in accordance with the received time information, specifying a correlation between a set including the specified operation times and a set including the specified in-home-absence times, receiving specification of a time from a device that uses the in-home-presence probability calculation system, calculating, when a specified operation time among the specified operation times is a time within a period of a certain time ending at the time at which the specification has been received, a probability that a person is at home at the specified time on the basis of the specified operation time and the specified correlation, and outputting the information as to whether or not a person is at home to the device that uses the in-home-presence probability calculation system on the basis of the calculated probability.

Note that these comprehensive and specific aspects may be realized by a system, an apparatus, and a computer program, and may also be realized by an arbitrary combination of some of a system, an apparatus, a method, and a computer program.

According to the above-described present disclosure, in the case where a certain operation has been performed for a device within a period of a certain time ending at the time at which specification of a time has been performed, a behavior pattern of a person, who is at home, after the person performs the certain operation until the person leaves home may be reflected and the in-home-presence probability at the specified time may be calculated, the behavior pattern having occurred in the past. As a result, there is a possibility that more accurate information may be provided as to whether or not a person is at home at a specified time.

BRIEF DESCRIPTION OF THE DRAWINGS

FIG. 10 is a data structure diagram illustrating an example of a device-person correspondence table according to the embodiment of the present disclosure.

DETAILED DESCRIPTION

Figure 1:
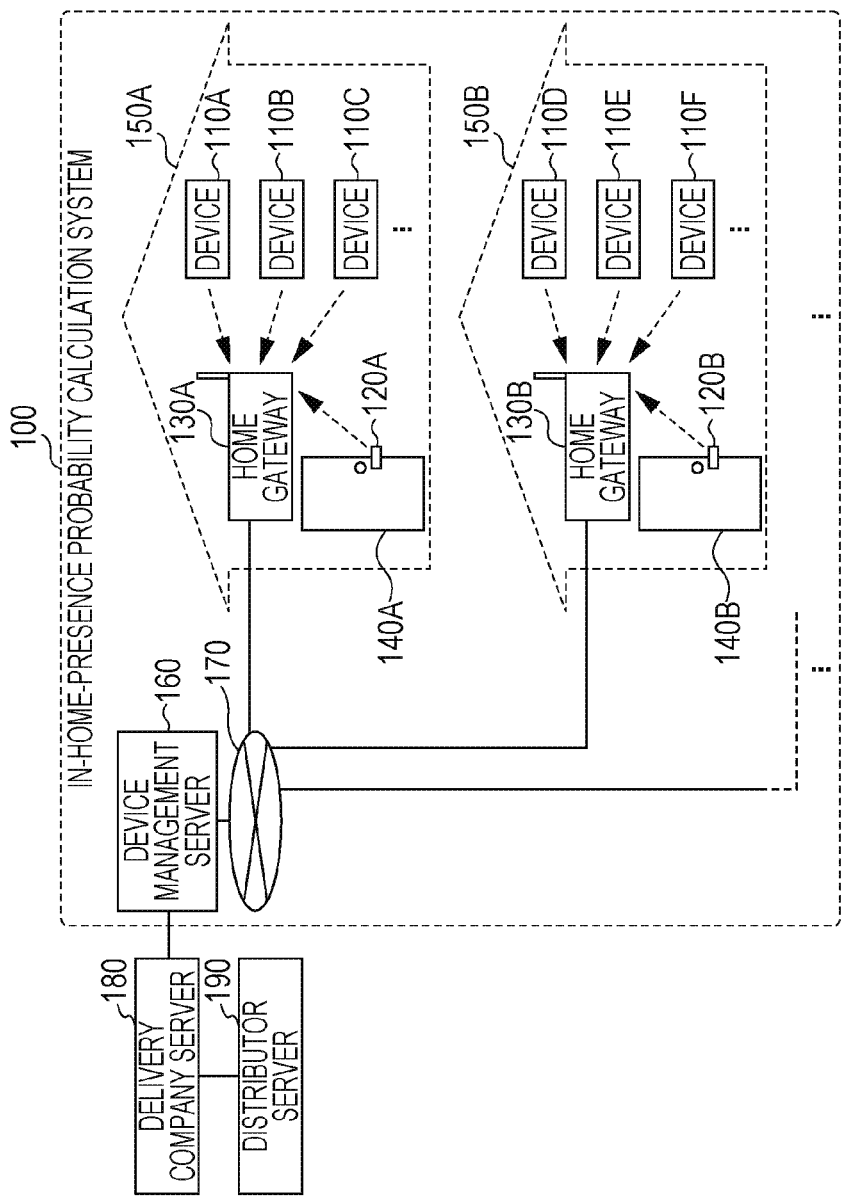
FIG. 1 is a system configuration diagram illustrating an example of the configuration of an in-home-presence probability calculation system according to an embodiment of the present disclosure.

First, for making an invention according to exemplary embodiments according to the present disclosure, matters analyzed by the inventors will be described.

Findings as a Basis for the Present Invention

Generally, how people who live in their homes spend time in everyday life vary from person to person. A resident does not always leave home almost at the same time of the day every day and does not always come home almost at the same time of the day every day. Thus, as described in Japanese Unexamined Patent Application Publication No. 2012-181789, as a matter of course, there is a certain limit to the extent to which the accuracy of calculation of an in-home-presence probability for each home at a specified time is increased in accordance with an over-time profile of the total amount of power used in a certain period of time in the past for the home.

However, even though a person does not leave home at almost at the same time of the day every day, for behavior patterns that the person takes before leaving home, it may be considered that the behavior patterns are similar to one another.

For example, in the case where a person often uses a device arranged indoors before leaving home (or going out), if it is possible to know that this device has been operated, it is considered that the person may take an action for leaving home.

The present disclosure is made to obtain an in-home-presence probability calculation method in which attention is paid to a behavior pattern that a person takes before leaving home, a correlation between an operation performed for a device arranged indoors and a time at which it is expected that the person has left home is used, and an in-home-presence probability is calculated as to whether or not the person is at home at a specified time, the in-home-presence probability calculation method having a possibility that more accurate information is provided as to whether or not the person is at home at the specified time on the basis of the calculated in-home-presence probability.

Embodiment

<Overview>

In the following, as an embodiment of an in-home-presence probability calculation method, a server apparatus, and an in-home-presence probability calculation system according to the present disclosure, an in-home-presence probability calculation system will be described that calculates an in-home-presence probability and provides information as to whether or not a person is at home to an apparatus on the basis of the calculated probability, the in-home-presence probability being a possibility that a person is at home where a device is arranged.

This in-home-presence probability calculation system generates histograms for respective one or more devices arranged in a home. For each device, the histogram illustrates the frequency of time differences each of which is a time difference between an operation time and an leaving-home time on the basis of a history of operation times at which a certain operation has been performed for the device (here, an operation for switching off a main power switch) and a history of leaving-home times at which a state has been entered in which it is expected that no one is at home.

Then, in the case where a time is specified by an apparatus that uses the in-home-presence probability calculation system, if a certain operation has been performed on any of the devices in a certain period of time in the past, the in-home-presence probability that a person is at home at the specified time is calculated using the histogram for the device and a time at which the certain operation has been performed. Then, information as to whether or not a person is at home is output to the apparatus that uses the in-home-presence probability calculation system, on the basis of the calculated in-home-presence probability. Here, a display device such as a display connected to the apparatus that uses the in-home-presence probability calculation system may be caused to display the information as to whether or not a person is at home.

As the apparatus that uses the in-home-presence probability calculation system, for example, a delivery company server 180 is described as an example, which will be described later.

As information as to whether or not a person is at home which is a delivery destination, a calculated in-home-presence probability will be described as an example in the embodiment; however, the information is not limited to the calculated in-home-presence probability. For example, a threshold for in-home-presence probabilities is preset, an in-home-presence probability is compared with the threshold, and information indicating whether or not a person is at home, which is a delivery destination, may also be output in accordance with a comparison result.

In the following, details of this in-home-presence probability calculation system will be described with reference to the drawings.

<Configuration>

FIG. 1 is a system configuration diagram illustrating an example of the configuration of an in-home-presence probability calculation system 100.

As illustrated in FIG. 1, the in-home-presence probability calculation system 100 includes, for example, a plurality of devices 110 (devices 110A to 110F and the like), a plurality of electric locks 120 (an electric lock 120A, an electric lock 120B, and the like), a plurality of home gateways 130 (a home gateway 130A, a home gateway 130B, and the like), a network 170, and a device management server 160.

The device management server 160 included in the in-home-presence probability calculation system 100 is connected to the delivery company server 180, which is an external server, and the delivery company server 180 is further connected to a distributor server 190, which is an external server. The device management server 160 and the delivery company server 180 are connected to each other via, for example, communication lines (or a network) such as the Internet. Alternatively, the device management server 160 and the delivery company server 180 may also be directly connected to each other via, for example, a cable or the like.

The delivery company server 180 and the distributor server 190 are connected to each other via, for example, communication lines (or a network) such as the Internet. Alternatively, the delivery company server 180 and the distributor server 190 may also be directly connected to each other via, for example, a cable or the like.

The above-described communication lines include, for example, a wireless communication line, a wired communication line, or both. In the following, constituents of the in-home-presence probability calculation system 100 will be described in a certain order.

The devices 110A to 110C are electronic devices such as a refrigerator, a washing machine, a microwave, a television, a recorder, a dryer, and the like arranged in a home 150A, each of which has a function for communicating with the device management server 160 via the home gateway 130A and the network 170.

The devices 110D to 110F are electronic devices such as a refrigerator, a washing machine, a microwave, a television, a recorder, a dryer, and the like arranged in a home 150B, each of which has a function for communicating with the device management server 160 via the home gateway 130B and the network 170.

In the following, the devices 110A to 110F will not be individually described. Instead, as a representative for the devices 110A to 110F, description will be made using a device 110, which is denoted by reference numeral 110.

Figure 2:
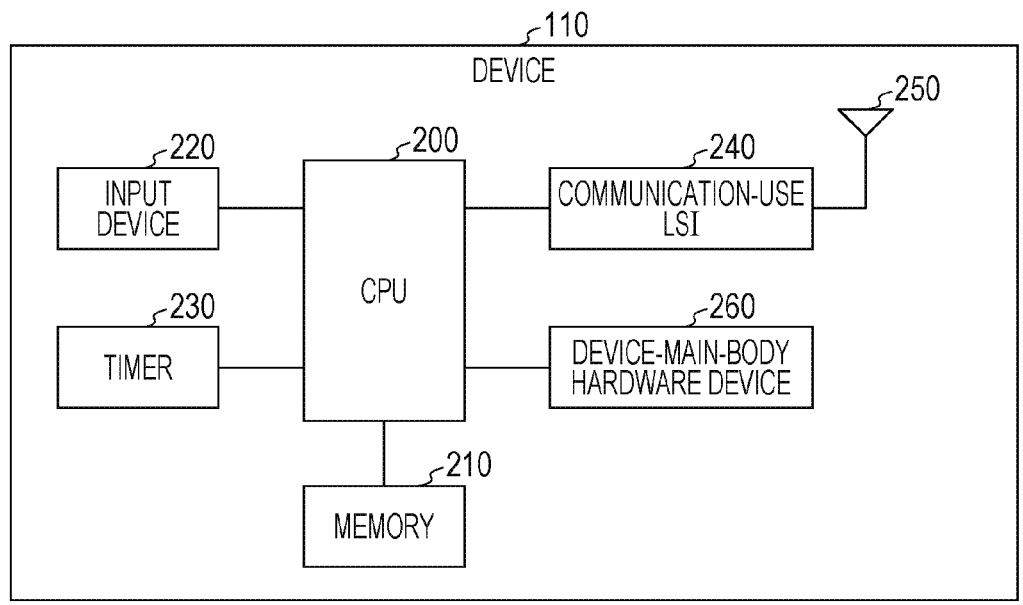
FIG. 2 is a block diagram illustrating an example of a circuit configuration of a device according to the embodiment of the present disclosure.

FIG. 2 is a block diagram illustrating an example of a circuit configuration of a device 110.

As illustrated in FIG. 2, the device 110 includes, for example, a central processing unit (CPU) 200, a memory 210, an input device 220, a timer 230, a communication-use large-scale integration (LSI) 240, an antenna 250, and a device-main-body hardware device 260.

The device-main-body hardware device 260 is connected to the CPU 200. The device-main-body hardware device 260 is a group of hardware devices for the device 110, which is an electronic device, for realizing a function as the electronic device under control performed by the CPU 200. For example, if the device 110 is a refrigerator, the device-main-body hardware device 260 corresponds to a group of hardware devices such as a compressor, a cooling fan, and the like for realizing the function of a refrigerator.

The antenna 250 is connected to the communication-use LSI 240, and used for communication performed by the communication-use LSI 240. The antenna 250 is, for example, a metal monopole antenna.

The communication-use LSI 240 is connected to the antenna 250 and the CPU 200 and controlled by the CPU 200. The communication-use LSI 240 has a modulation function for modulating a transmission-use signal sent from the CPU 200 and a transmission function for transmitting a modulated signal to the home gateway 130 using the antenna 250.

Here, communication performed between the communication-use LSI 240 and the home gateway 130 is based on, for example, the Bluetooth® standards.

The input device 220 is connected to the CPU 200, and has a function for converting an operation performed by a user who uses the device 110 into an electrical signal and sending the electrical signal to the CPU 200. The input device 220 is realized by, for example, an operation panel having a touch panel, a remote controller having a group of operation buttons, and the like. In the case where the input device 220 is realized by including, for example, a remote controller, the remote controller and a device main body communicate with each other, for example, using wireless communication such as infrared communication.

The timer 230 is connected to the CPU 200 and controlled by the CPU 200, and has a function for measuring time.

The memory 210 is connected to the CPU 200. The memory 210 includes any one of a random-access memory (RAM), a read-only memory (ROM), and a flash memory, or a combination of two or more of a RAM, a ROM, and a flash memory. The memory 210 stores, for example, a program that defines an operation of the CPU 200 and data that the CPU 200 uses.

In addition, the memory 210 stores a device ID with which the device 110 is uniquely identified.

The CPU 200 is connected to the memory 210, the input device 220, the timer 230, the communication-use LSI 240, and the device-main-body hardware device 260. By executing the program stored in the memory 210, the CPU 200 has a function for controlling the memory 210, the input device 220, the timer 230, the communication-use LSI 240, and the device-main-body hardware device 260 and causing the device 110 to realize the following two functions.

A device control function: a function for controlling a device 110 and causing the device 110 to realize general functions as a device. Here, the general functions as a device are, for example, when the device is a television, a program playback function, a channel switching function, and the like and, for example, when the device is a washing machine, a rinse function, a water removing function, and the like.

An operation history information transmission function: a function for controlling a device 110 and causing, every time the device 110 is operated by a user who uses the device 110, the device 110 to create operation information and to transmit the operation information to the device management server 160 via the home gateway 130 and the network 170, the operation information including operation content information indicating the content of the operation, operation time information indicating the time at which the operation has been performed, and the device ID stored in the memory 210.

Regarding a device 110 having the above-described circuit configuration, the configuration will be described from a functional aspect in the following.

Figure 3:
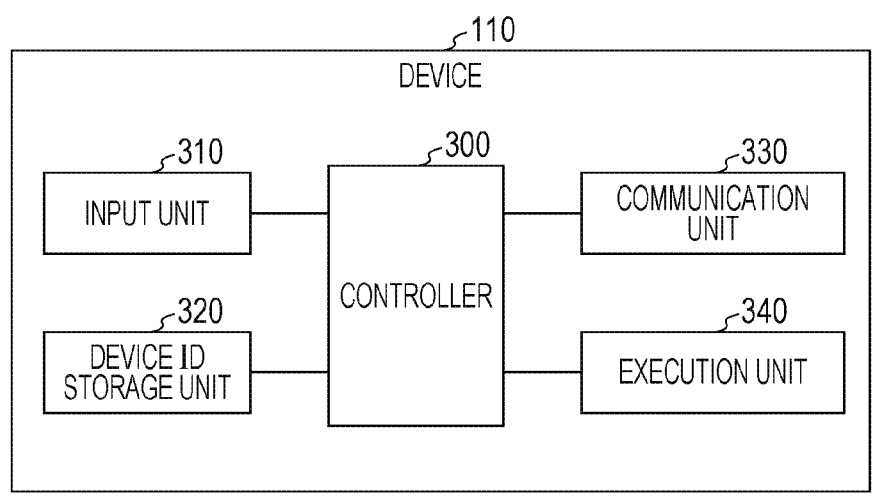
FIG. 3 is a block diagram illustrating an example of a functional configuration of the device according to the embodiment of the present disclosure.

FIG. 3 is a block diagram illustrating an example of a functional configuration of the device 110.

As illustrated in FIG. 3, the device 110 includes, for example, a controller 300, an input unit 310, a device ID storage unit 320, a communication unit 330, and an execution unit 340.

The device ID storage unit 320 is realized by a portion of a storage region included in the memory 210, and has a function for storing a device ID.

The input unit 310 is realized by the CPU 200, which executes a program, the input device 220, and the timer 230 and controlled by the controller 300, and has the following three functions.

An operation reception function: a function for receiving a user operation performed using the input device 220 by a user who uses the device 110.

A command creation function: a function for creating, in the case where a user operation has been received, an execution command and sending the execution command to the execution unit 340, the execution command being a command for causing the device-main-body hardware device 260 to execute an action corresponding to the user operation.

An operation information creation function: a function for creating, every time a user operation is received, operation information and transmitting the operation information to the communication unit 330, the operation information including operation content information indicating the content of the operation, operation time information indicating the time at which the operation has been performed, and the device ID stored in the memory 210.

The communication unit 330 is realized by the CPU 200, which executes a program, the communication-use LSI 240, and the antenna 250 and controlled by the controller 300. The communication unit 330 has a function for communicating with the home gateway 130 in accordance with the Bluetooth® standards and a function for communicating with the device management server 160 via the home gateway 130 and the network 170.

Here, when operation information is sent from the input unit 310, the communication unit 330 transmits the operation information to the device management server 160.

The execution unit 340 is realized by the CPU 200, which executes a program, and the device-main-body hardware device 260. The execution unit 340 is controlled by the controller 300, and has a function for executing, in the case where an execution command has been sent from the input unit 310, the execution command using the device-main-body hardware device 260.

The controller 300 is realized by the CPU 200, which executes a program. The controller 300 has a function for controlling the input unit 310, the device ID storage unit 320, the communication unit 330, and the execution unit 340 and causing the device 110 to realize the device control function and the operation history information transmission function described above.

Returning to FIG. 1 again, the in-home-presence probability calculation system 100 is further described.

The electric lock 120A is an electric lock for locking/unlocking (hereinafter referred to as locking and unlocking) an entrance 140A of the home 150A, and has a function for communicating with the device management server 160 via the home gateway 130A and the network 170.

The electric lock 120B is an electric lock for locking and unlocking an entrance 140B of the home 150B and has a function for communicating with the device management server 160 via the home gateway 130B and the network 170.

In the following, the electric locks 120A and 120B will not be individually described. Instead, as a representative for the electric locks 120A and 120B, description will be made using an electric lock 120, which is denoted by reference numeral 120.

Figure 4:
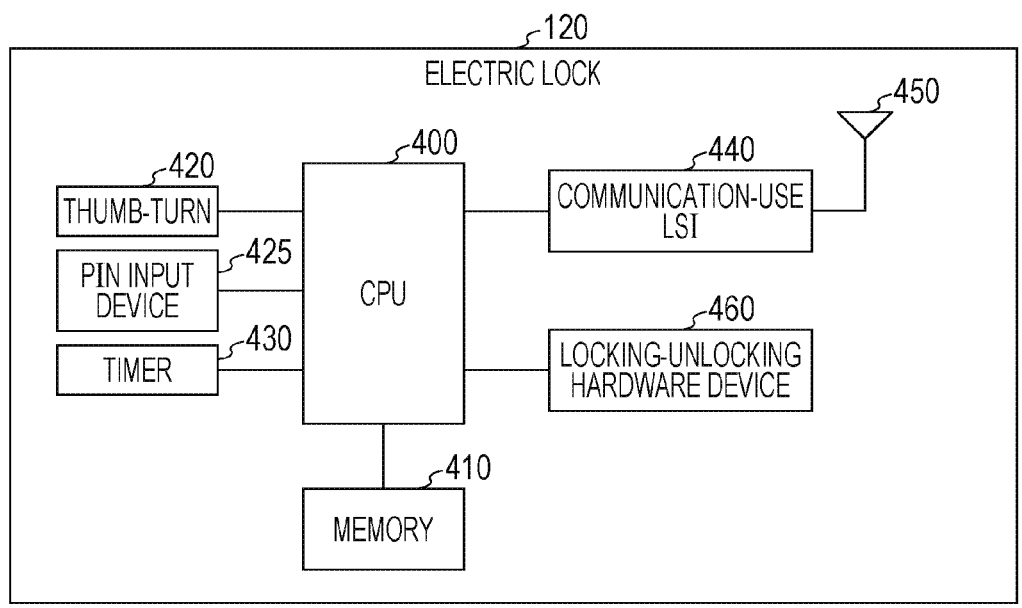
FIG. 4 is a block diagram illustrating an example of a circuit configuration of an electric lock according to the embodiment of the present disclosure.

FIG. 4 is a block diagram illustrating an example of a circuit configuration of an electric lock 120.

As illustrated in FIG. 4, the electric lock 120 includes, for example, a CPU 400, a memory 410, a thumb-turn 420, a PIN input device 425, a timer 430, a communication-use LSI 440, an antenna 450, and a locking-unlocking hardware device 460.

The locking-unlocking hardware device 460 is connected to the CPU 400. The locking-unlocking hardware device 460 is a group of hardware devices for physically locking and unlocking an entrance 140 under control performed by the CPU 400 and is realized by, for example, a latch, a servomotor, and the like.

The antenna 450 is connected to the communication-use LSI 440 and used for communication performed by the communication-use LSI 440. The antenna 450 is, for example, a metal monopole antenna.

The communication-use LSI 440 is connected to the antenna 450 and the CPU 400 and controlled by the CPU 400. The communication-use LSI 440 has a modulation function for modulating a transmission-use signal sent from the CPU 400 and a transmission function for transmitting a modulated signal to the home gateway 130 using the antenna 450.

Here, communication performed between the communication-use LSI 440 and the home gateway 130 is based on, for example, the Bluetooth® standards.

The thumb-turn 420 is connected to the CPU 400. The thumb-turn 420 is a device that is installed on the indoor side of the entrance 140 and that receives a rotational-manner locking-unlocking operation. The thumb-turn 420 has a function for converting a rotational-manner locking-unlocking operation performed by a user who uses the electric lock 120 into an electrical signal and sending the electrical signal to the CPU 400.

The PIN input device 425 is connected to the CPU 400, and is a device that is installed on the outdoor side of the entrance 140 and that receives a PIN input operation for locking and unlocking. The PIN input device 425 has a function for converting a PIN input operation performed by a user who uses the electric lock 120 into an electrical signal and sending the electrical signal to the CPU 400.

The timer 430 is connected to and controlled by the CPU 400, and has a function for measuring time.

The memory 410 is connected to the CPU 400. The memory 410 may be any one of a RAM, a ROM, and a flash memory, or a combination of two or more of a RAM, a ROM, and a flash memory. The memory 410 stores, for example, a program that defines an operation of the CPU 400 and data that the CPU 400 uses.

In addition, the memory 410 stores an electric lock ID with which the electric lock 120 is uniquely identified.

The CPU 400 is connected to the memory 410, the thumb-turn 420, the PIN input device 425, the timer 430, the communication-use LSI 440, and the locking-unlocking hardware device 460. For example, by executing the program stored in the memory 410, the CPU 400 has a function for controlling the memory 410, the thumb-turn 420, the PIN input device 425, the timer 430, the communication-use LSI 440, and the locking-unlocking hardware device 460 and causing the electric lock 120 to realize the following three functions.

A thumb-turn locking-unlocking function: a function for controlling an electric lock 120 and causing the electric lock 120 to lock the entrance 140 in the case where a locking operation has been performed on the thumb-turn 420 and to unlock the entrance 140 in the case where an unlocking operation has been performed on the thumb-turn 420 by a user who uses the electric lock 120.

A PIN locking-unlocking function: a function for controlling an electric lock 120, causing the electric lock 120 to determine whether or not, in the case where a PIN input operation has been performed on the PIN input device 425, the PIN is a certain PIN indicating a locking operation and whether or not the PIN is a certain PIN indicating an unlocking operation, and causing the electric lock 120 to lock the entrance 140 in the case where the PIN is a certain PIN indicating a locking operation and to unlock the entrance 140 in the case where the PIN is a certain PIN indicating an unlocking operation.

A leaving-home coming-home detection function: a function for controlling an electric lock 120, causing the electric lock 120 to execute a leaving-home coming-home detection process, and then causing (1) in the case where a certain operation with which it is expected that a user using the electric lock 120 has left home from indoors to outdoors has been performed for the electric lock 120 by the user, the electric lock 120 to create a leaving-home detection signal and to send the leaving-home detection signal to the device management server 160 via the home gateway 130 and the network 170 and (2) in the case where a certain operation with which it is expected that a user using the electric lock 120 has come home from outdoors to indoors has been performed for the electric lock 120 by the user, the electric lock 120 to create a coming-home detection signal and to send the coming-home detection signal to the device management server 160 via the home gateway 130 and the network 170, the leaving-home detection signal including information indicating the time at which the operation has been performed and the electric lock ID stored in the memory 210, the coming-home detection signal including information indicating the time at which the operation has been performed and the electric lock ID stored in the memory 210.

Note that the leaving-home coming-home detection process performed by an electric lock 120 will be described later in detail using a flowchart in the section of <Leaving-home Coming-home Detection Process>.

Regarding an electric lock 120 having the above-described circuit configuration, the configuration will be described from a functional aspect in the following.

Figure 5:
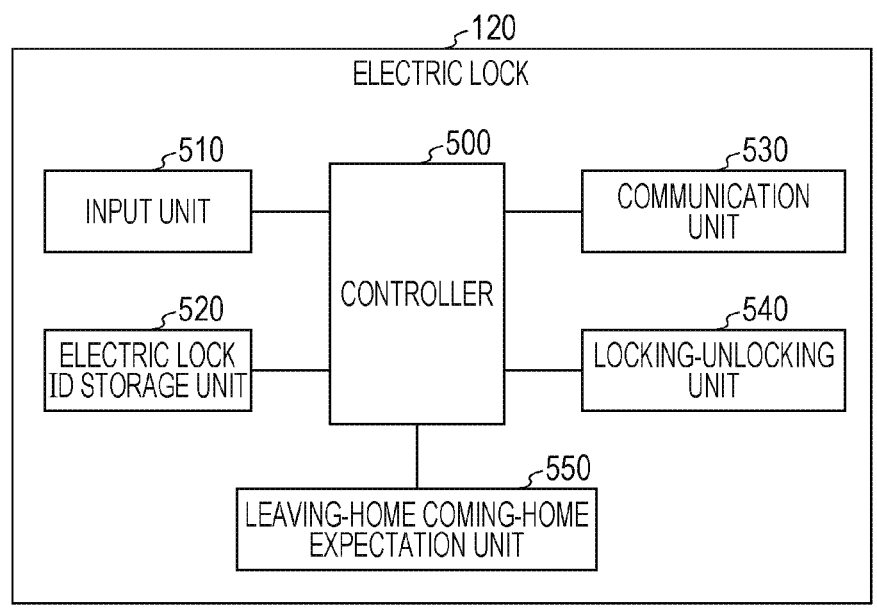
FIG. 5 is a block diagram illustrating an example of a functional configuration of the electric lock according to the embodiment of the present disclosure.

FIG. 5 is a block diagram illustrating an example of a functional configuration of the electric lock 120.

As illustrated in FIG. 5, the electric lock 120 includes, for example, a controller 500, an input unit 510, an electric lock ID storage unit 520, a communication unit 530, a locking-unlocking unit 540, and an leaving-home coming-home expectation unit 550.

The electric lock ID storage unit 520 is realized by a portion of a storage region included in the memory 210 and has a function for storing an electric lock ID.

The input unit 510 is realized by the CPU 400, which executes a program, the thumb-turn 420, the PIN input device 425, and the timer 430, and has the following four functions.

A thumb-turn locking operation reception function: a function for receiving a locking operation performed by a user who uses an electric lock 120 using the thumb-turn 420, creating an execution command for causing the locking-unlocking hardware device 460 to lock the entrance 140, sending the execution command to the locking-unlocking unit 540, and sending thumb-turn locking operation time information indicating the time at which the locking operation has been received to the leaving-home coming-home expectation unit 550.

A thumb-turn unlocking operation reception function: a function for receiving an unlocking operation performed by a user who uses an electric lock 120 using the thumb-turn 420, creating an execution command for causing the locking-unlocking hardware device 460 to unlock the entrance 140, sending the execution command to the locking-unlocking unit 540, and sending thumb-turn unlocking operation time information indicating the time at which the unlocking operation has been received to the leaving-home coming-home expectation unit 550.

A PIN locking operation reception function: a function for receiving a PIN input operation performed by a user who uses an electric lock 120 using the PIN input device 425 and determining whether or not the PIN is a certain PIN indicating a locking operation, and is a function for, in the case where the PIN is a certain PIN indicating a locking operation, creating an execution command for causing the locking-unlocking hardware device 460 to lock the entrance 140, sending the execution command to the locking-unlocking unit 540, and sending PIN locking operation time information indicating the time at which the PIN input operation has been received to the leaving-home coming-home expectation unit 550.

A PIN unlocking operation reception function: a function for receiving a PIN input operation performed by a user who uses an electric lock 120 using the PIN input device 425 and determining whether or not the PIN is a certain PIN indicating an unlocking operation and is a function for, in the case where the PIN is a certain PIN indicating an unlocking operation, creating an execution command for causing the locking-unlocking hardware device 460 to unlock the entrance 140, sending the execution command to the locking-unlocking unit 540, and sending PIN unlocking operation time information indicating the time at which the PIN input operation has been received to the leaving-home coming-home expectation unit 550.

The leaving-home coming-home expectation unit 550 is realized by the CPU 400, which executes a program, and has the following two functions.

A leaving-home detection function: a function for determining that a certain operation with which it is expected that a user using an electric lock 120 has left home from indoors to outdoors has been performed by the user in the case where PIN locking operation time information is sent from the input unit 510 within a certain time T1 (for example, 30 seconds) after thumb-turn unlocking operation time information has been sent, creating a leaving-home detection signal, and sending the leaving-home detection signal to the communication unit 530, the leaving-home detection signal including leaving-home time information indicating the time indicated by the PIN locking operation time information and the electric lock ID stored in the memory 210.

A coming-home detection function: a function for determining that a certain operation with which it is expected that a user using an electric lock 120 has come home from outdoors to indoors has been performed by the user in the case where thumb-turn locking operation time information is sent from the input unit 510 within the certain time T1 after PIN unlocking operation time information has been sent, creating a coming-home detection signal, and sending the coming-home detection signal to the communication unit 530, the coming-home detection signal including coming-home time information indicating the time indicated by the thumb-turn locking operation time information and the electric lock ID stored in the memory 210.

The communication unit 530 is realized by the CPU 400, which executes a program, the communication-use LSI 440, and the antenna 450. The communication unit 530 is controlled by the controller 500, and has a function for communicating with the home gateway 130 in accordance with the Bluetooth® standards and a function for communicating with the device management server 160 via the home gateway 130 and the network 170.

Here, when a leaving-home detection signal or a coming-home detection signal is sent from the leaving-home coming-home expectation unit 550, the communication unit 530 transmits the leaving-home detection signal or the coming-home detection signal sent from the leaving-home coming-home expectation unit 550 to the device management server 160.

The locking-unlocking unit 540 is realized by the CPU 400, which executes a program, and the locking-unlocking hardware device 460. The locking-unlocking unit 540 is controlled by the controller 500, and has a function for executing, in the case where an execution command has been sent from the input unit 510, the execution command using the locking-unlocking hardware device 460.

The controller 500 is realized by the CPU 400, which executes a program. The controller 500 has a function for controlling the input unit 510, the electric lock ID storage unit 520, the communication unit 530, the locking-unlocking unit 540, and the leaving-home coming-home expectation unit 550 and causing the electric lock 120 to realize the thumb-turn locking-unlocking function, the PIN locking-unlocking operation function, and the leaving-home coming-home detection function described above.

Returning to FIG. 1 again, the in-home-presence probability calculation system 100 is further described.

The home gateway 130A is a communication device arranged in the home 150A and is connected to the network 170. The home gateway 130A has a function for relaying communication between, for example, the devices 110A to 110C, the electric lock 120A, and the device management server 160.

The home gateway 130B is a communication device arranged in the home 150B and is connected to the network 170. The home gateway 130B has a function for relaying communication between, for example, the devices 110D to 110F, the electric lock 120B, and the device management server 160.

In the following, the home gateway 130A and the home gateway 130B will not be individually described. Instead, as a representative for the home gateway 130A and the home gateway 130B, description will be made using a home gateway 130, which is denoted by reference numeral 130.

Figure 6:
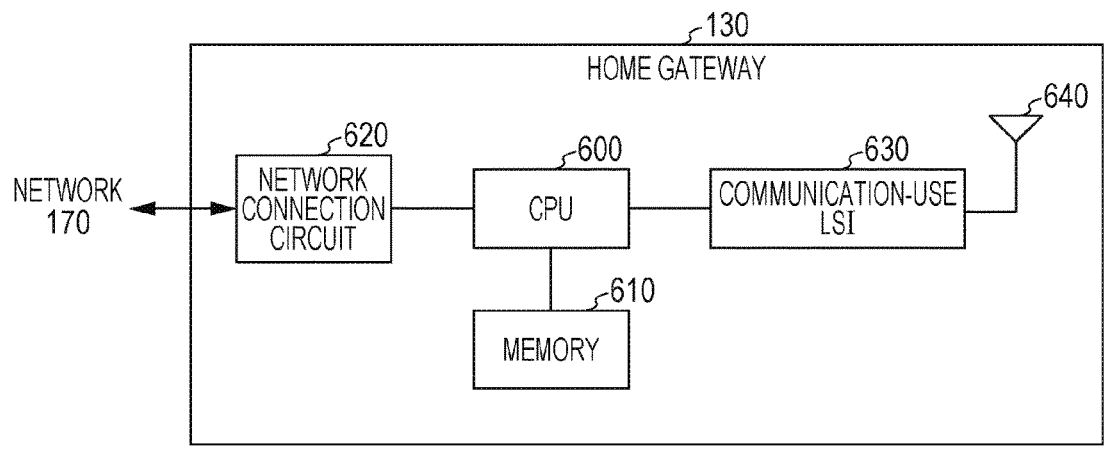
FIG. 6 is a block diagram illustrating an example of a circuit configuration of a home gateway according to the embodiment of the present disclosure.

FIG. 6 is a block diagram illustrating an example of a circuit configuration of a home gateway 130.

As illustrated in FIG. 6, the home gateway 130 includes, for example, a CPU 600, a memory 610, a network connection circuit 620, a communication-use LSI 630, and an antenna 640.

The antenna 640 is connected to the communication-use LSI 630 and used for communication performed by the communication-use LSI 630. The antenna 640 is, for example, a metal monopole antenna.

The memory 610 is, for example, connected to the CPU 600. The memory 610 includes any one of a RAM, a ROM, and a flash memory, or a combination of two or more of a RAM, a ROM, and a flash memory. The memory 610 stores, for example, a program that defines an operation of the CPU 600 and data that the CPU 600 uses.

The communication-use LSI 630 is connected to the antenna 640 and the CPU 600. The communication-use LSI 630 is controlled by the CPU 600. The communication-use LSI 630 has a receiving function for receiving a signal transmitted from a device 110 or the electric lock 120 using the antenna 640 and a demodulating function for demodulating a received signal and sending the resulting signal to the CPU 600.

Note that communication performed between the communication-use LSI 630 and a device 110 and between the communication-use LSI 630 and the electric lock 120 is based on, for example, the Bluetooth® standards.

The network connection circuit 620 is connected to the CPU 600 and the network 170. The network connection circuit 620 is controlled by the CPU 600, and has a function for transmitting a signal sent from the CPU 600 to an external device via the network 170.

The CPU 600 is connected to the memory 610, the network connection circuit 620, and the communication-use LSI 630. By executing the program stored in the memory 610, the CPU 600 has a function for controlling the memory 610, the network connection circuit 620, and the communication-use LSI 630 and causing the home gateway 130 to realize a communication relay function for relaying communication performed between the device management server 160, a device 110, and the electric lock 120.

Regarding a home gateway 130 having the above-described circuit configuration, the configuration will be described from a functional aspect in the following.

Figure 7:
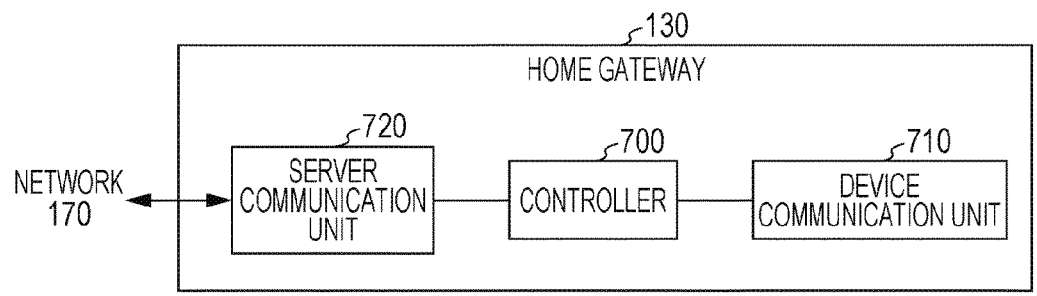
FIG. 7 is a block diagram illustrating an example of a functional configuration of the home gateway according to the embodiment of the present disclosure.

FIG. 7 is a block diagram illustrating an example of a functional configuration of the home gateway 130.

As illustrated in FIG. 7, the home gateway 130 includes, for example, a controller 700, a device communication unit 710, and a server communication unit 720.

The device communication unit 710 is realized by the CPU 600, which executes a program, the communication-use LSI 630, and the antenna 640. The device communication unit 710 is controlled by the controller 700, and has a function for communicating with a device 110 and the electric lock 120 in accordance with the Bluetooth® standards.

The server communication unit 720 is realized by the CPU 600, which executes a program, and the network connection circuit 620. The server communication unit 720 is controlled by the controller 700, and has a function for communicating with the device management server 160 via the network 170.

The controller 700 is realized by the CPU 600, which executes a program. The controller 700 has a function for controlling the device communication unit 710 and the server communication unit 720 and causing the home gateway 130 to realize the above-described communication relay function.

Returning to FIG. 1 again, the in-home-presence probability calculation system 100 is further described.

The network 170 is a network connected to the home gateway 130A, the home gateway 130B, the device management server 160, and the like, and has a function for transferring a signal between connected devices.

The device management server 160 is a computer equipped with, for example, a processor, a storage device, and a communication circuit, and serves as the device management server 160 by reading a program stored in the storage device and causing the processor to execute the program. The storage device includes, for example, either a memory or a hard disk, or a combination of a memory and a hard disk. A memory includes any one of a RAM, a ROM, and a flash memory, or a combination of two or more of a RAM, a ROM, and a flash memory.

The device management server 160 is connected to, for example, the network 170 and the delivery company server 180, and has a function for communicating with a device 110 and an electric lock 120 via the network 170 and the home gateway 130 and a function for communicating with the delivery company server 180.

Figure 8:
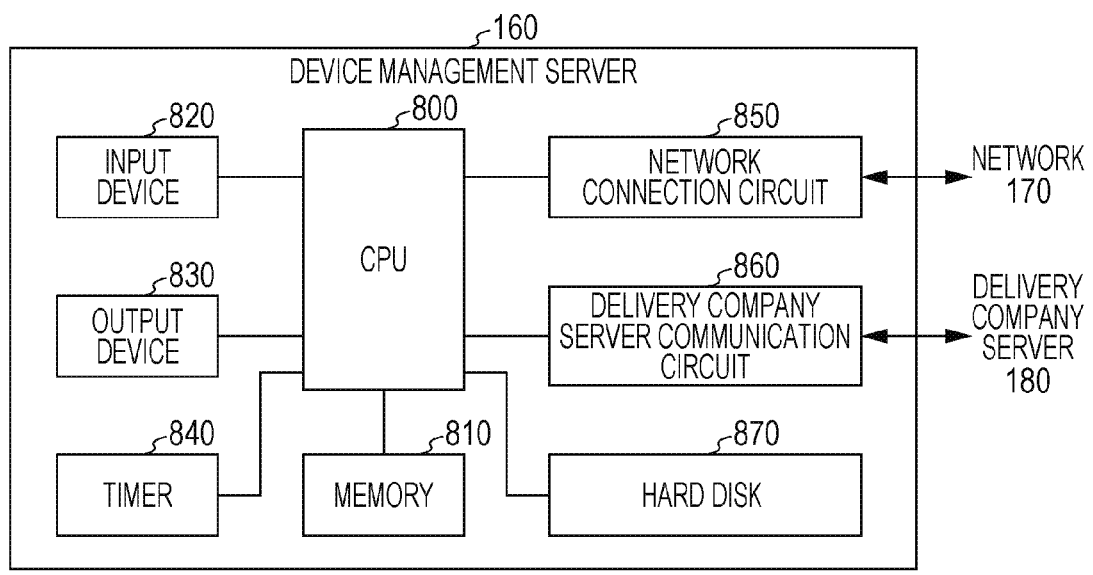
FIG. 8 is a block diagram illustrating an example of a circuit configuration of a device management server according to the embodiment of the present disclosure.

FIG. 8 is a block diagram illustrating an example of a circuit configuration of the device management server 160.

As illustrated in FIG. 8, the device management server 160 includes, for example, a CPU 800 corresponding to a processor, a memory 810 corresponding to a storage device, an input device 820, an output device 830, a timer 840, a network connection circuit 850, a delivery company server communication circuit 860, and a hard disk 870 corresponding to a storage device.

The memory 810 is connected to, for example, the CPU 800, and includes any one of a RAM, a ROM, and a flash memory, or a combination of two or more of a RAM, a ROM, and a flash memory. The memory 810 stores, for example, a program that defines an operation of the CPU 800 and data that the CPU 800 uses.

The input device 820 is connected to and controlled by the CPU 800. The input device 820 has a function for receiving an operation performed by a user who uses the device management server 160, converting the received operation into an electrical signal, and sending the electrical signal to the CPU 800. The input device 820 includes, as examples, a keyboard and a mouse.

The output device 830 is connected to and controlled by the CPU 800, and has a function for presenting (or outputting) information (for example, any one of characters, a video, and a sound, or a combination of two or more of characters, a video, and a sound) to a user using the device management server 160. The output device 830 includes, as examples, a display and a speaker.

The timer 840 is connected to and controlled by the CPU 800, and has a function for measuring time.

The network connection circuit 850 is connected to the CPU 800 and the network 170 and controlled by the CPU 800. The network connection circuit 850 has a function for transmitting a signal sent from the CPU 800 to an external device via the network 170 and a function for receiving a signal transmitted from an external device via the network 170 and sending the signal to the CPU 800.

The delivery company server communication circuit 860 is connected to the CPU 800 and the delivery company server 180 and controlled by the CPU 800. The delivery company server communication circuit 860 has a function for transmitting a signal sent from the CPU 800 to the delivery company server 180 and a function for receiving a signal transmitted from the delivery company server 180 and sending the signal to the CPU 800.

The hard disk 870 is connected to and controlled by the CPU 800, and has a function for storing data that the CPU 800 uses.

The CPU 800 is connected to, for example, the memory 810, the input device 820, the output device 830, the timer 840, the network connection circuit 850, the delivery company server communication circuit 860, and the hard disk 870. By executing, for example, the program stored in the memory 810, the CPU 800 has a function for controlling the memory 810, the input device 820, the output device 830, the timer 840, the network connection circuit 850, the delivery company server communication circuit 860, and the hard disk 870 and causing the device management server 160 to realize the following six functions.

A device operation log creation function: a function for controlling the device management server 160, causing the device management server 160 to collect and store, about homes in each of which one or more devices 110 are arranged, operation information transmitted from each of the devices 110 arranged in each of the homes, and causing the device management server 160 to create, for the home, a device operation log indicating a history of times at which the one or more devices 110 have been operated. Note that this device operation log will be described later using the drawings.

A leaving-home coming-home log creation function: a function for controlling the device management server 160, causing the device management server 160 to collect and store, about homes in each of which an electric lock 120 is installed, a leaving-home detection signal and a coming-home detection signal transmitted from the electric lock 120 installed in each of the homes, and causing the device management server 160 to create, for the home, a leaving-home coming-home log indicating a history of times at each of which a person has left or come home. Note that this leaving-home coming-home log will be described later using the drawings.

An always-on device exclusion function: a function for controlling the device management server 160, causing the device management server 160 to execute an always-on device exclusion process, which is a characteristic operation of the device management server 160, and then causing the device management server 160 to specify devices operated in a state in which the main power switch is always turned on and to exclude the specified devices from devices which are targets of a histogram creation process (to be described later). For example, a refrigerator and the like correspond to devices operated in the state in which the main power switch is always turned on. Here, by excluding the devices operated in the state in which the main power switch is always turned on from the devices which are targets of the histogram creation process, the amount of processing is reduced in the histogram creation process.

Note that the always-on device exclusion process performed by the device management server 160 will be described later in detail using a flowchart in the section of <Always-on Device Exclusion Process>.

The histogram creation function: a function for controlling the device management server 160, causing the device management server 160 to execute the histogram creation process, which is a characteristic operation of the device management server 160, and then causing the device management server 160 to create, for each device 110 which is a target, a histogram of the time difference between a time at which the main power switch of the device 110 is turned off and a time at which it is expected that a person has left home where the device 110 is arranged, using the created device operation log and the created leaving-home coming-home log.

Note that the histogram creation process performed by the device management server 160 will be described later in detail using a flowchart in the section of <Histogram Creation Process>.

A cumulative histogram creation function: a function for controlling the device management server 160, causing the device management server 160 to execute the cumulative histogram creation process, which is a characteristic operation of the device management server 160, and then causing the device management server 160 to create a cumulative histogram about a histogram that satisfies certain conditions.

Note that the cumulative histogram creation process performed by the device management server 160 will be described later in detail using a flowchart in the section of <Cumulative Histogram Creation Process>.

An in-home-presence probability calculation function: a function for controlling the device management server 160, causing the device management server 160 to execute the in-home-presence probability calculation process, which is a characteristic operation of the device management server 160, and then causing the device management server 160 to calculate, about a specified person's home, an in-home-presence probability for a specified time.

Note that the in-home-presence probability calculation process performed by the device management server 160 will be described later in detail using a flowchart in the section of <In-home-presence Probability Calculation Process>.

Regarding a device management server 160 having the above-described circuit configuration, the configuration will be described from a functional aspect in the following.

Figure 9:
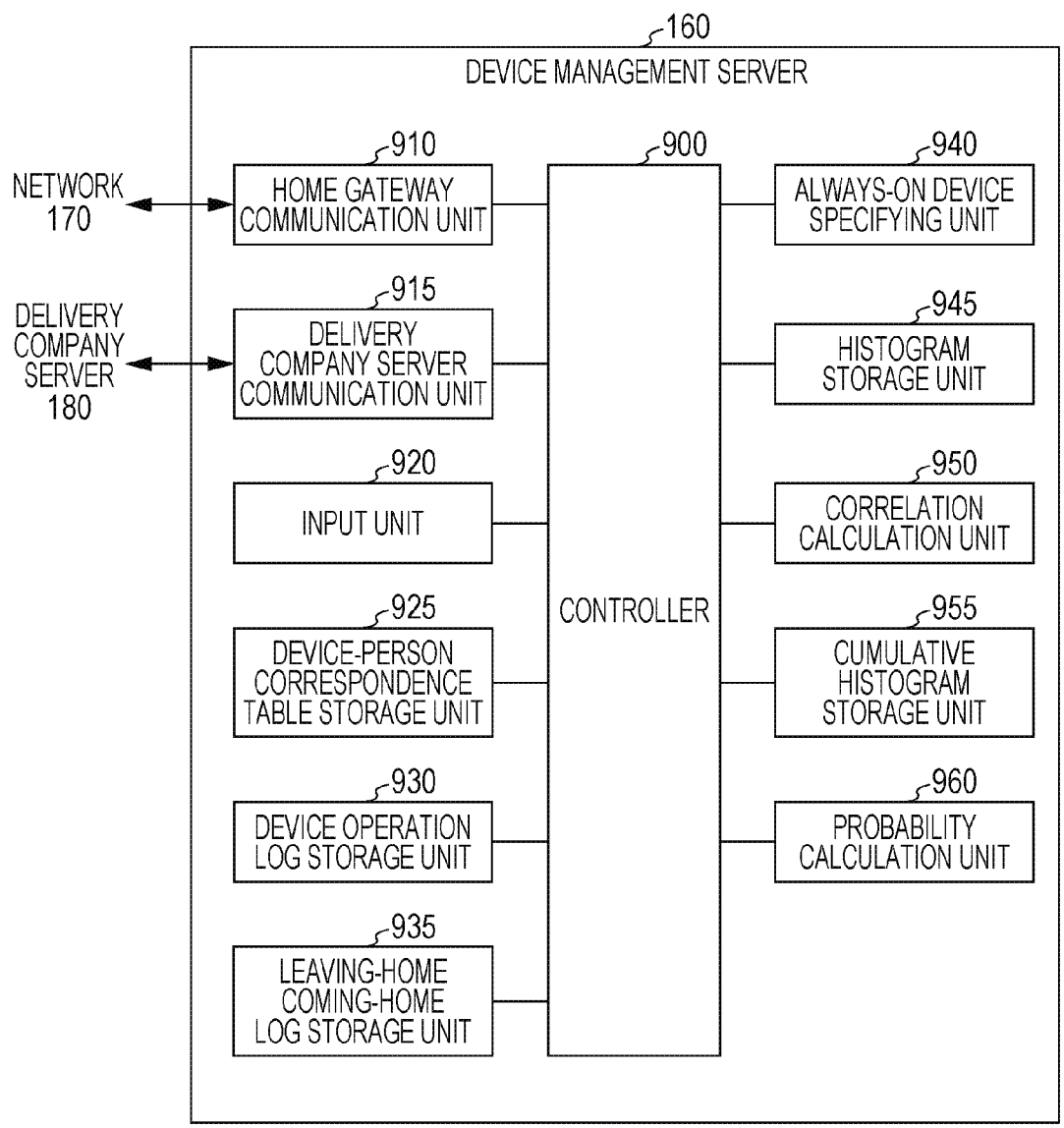
FIG. 9 is a block diagram illustrating an example of a functional configuration of the device management server according to the embodiment of the present disclosure.

FIG. 9 is a block diagram illustrating an example of a functional configuration of the device management server 160.

As illustrated in FIG. 9, the device management server 160 includes, for example, a controller 900, a home gateway communication unit 910, a delivery company server communication unit 915, input unit 920, a device operation log storage unit 930, a leaving-home coming-home log storage unit 935, an always-on device specifying unit 940, a device-person correspondence table storage unit 925, a histogram storage unit 945, a correlation calculation unit 950, a cumulative histogram storage unit 955, and a probability calculation unit 960.

The home gateway communication unit 910 is realized by the CPU 800, which executes a program, and the network connection circuit 850. The home gateway communication unit 910 is controlled by the controller 900, and has a function for communicating with the home gateways 130 via the network 170 and a function for communicating with the devices 110 and the electric locks 120 via the network 170 and the home gateways 130.

The delivery company server communication unit 915 is realized by the CPU 800, which executes a program, the delivery company server communication circuit 860, and the timer 840. The delivery company server communication unit 915 is controlled by the controller 900, and has a function for communicating with the delivery company server 180 and a function for specifying a time at which communication has been performed.

An input unit 920 is realized by the CPU 800, which executes a program, and the input device 820. The input unit 920 is controlled by the controller 900. The input unit 920 has a function for receiving an input operation performed by a user using the device management server 160.

Note that although not illustrated in FIG. 9, the device management server 160 may also include an output unit. The output unit is realized by, for example, the CPU 800, which executes a program, and the output device 830. The output unit is controlled by the controller 900. The output unit has a function for presenting (or outputting) information (for example, any one of characters, a video, and a sound, or a combination of two or more of characters, a video, and a sound) to a user using the device management server 160.

The device-person correspondence table storage unit 925 is realized by a portion of a storage region of the hard disk 870, and has a function for storing a device-person correspondence table 1000 created by the controller 900.

FIG. 10 is a data structure diagram illustrating an example of the device-person correspondence table 1000 stored in the device-person correspondence table storage unit 925.

As illustrated in FIG. 10, the device-person correspondence table 1000 includes person names 1010, person IDs 1020, electric lock IDs 1030, device IDs 1040, and always-on flags 1050, which are associated with each other.

A person name 1010 is the name of a person using the in-home-presence probability calculation system 100.

A person ID 1020 is an identifier used to identify a person having a person name 1010 associated with the person ID 1020.

An electric lock ID 1030 is an identifier used to identify an electric lock 120 installed in a person's home, the person being identified by a person ID 1020 associated with the electric lock ID 1030.

A device ID 1040 is an identifier used to identify a device 110 arranged in a person's home, the person being identified by a person ID 1020 associated with the device ID 1040.

An always-on flag 1050 is a one-bit flag whose logical value is "1" in the case where a device 110 identified by a device ID 1040 associated with the always-on flag 1050 is specified as a device operated in the state in which the main power switch is always turned on and whose logical value is "0" in the other cases.

Here, an initial value of the always-on flag 1050 is a logical value of "0".

Returning to FIG. 9 again, the functional configuration of the device management server 160 is further described.

The device operation log storage unit 930 is realized by a portion of the storage region of the hard disk 870. The device operation log storage unit 930 has a function for storing a device operation log 1100 created by the controller 900.

Here, as described later, for each of the person IDs 1020 included in the device-person correspondence table 1000 stored in the device-person correspondence table storage unit 925, the controller 900 creates a device operation log 1100 associated with the person ID 1020. Thus, the controller 900 creates device operation logs 1100 the number of which is the same as that of the person IDs 1020 included in the device-person correspondence table 1000 stored in the device-person correspondence table storage unit 925. Then, the device operation log storage unit 930 stores all the device operation logs 1100 created by the controller 900.

Figure 11:
FIG. 11 is a data structure diagram illustrating an example of a device operation log according to the embodiment of the present disclosure.

FIG. 11 is a data structure diagram illustrating an example of a device operation log 1100 stored in the device operation log storage unit 930.

As illustrated in FIG. 11, the device operation log 1100 includes device IDs 1110, times 1120, and operation contents 1130, which are associated with each other.

The device operation log 1100 is associated with any of the person IDs 1020 included in the device-person correspondence table 1000 stored in the device-person correspondence table storage unit 925.

The device operation log 1100 is a log indicating a history of operations performed in the past for the devices 110 associated with the person ID 1020 associated with the device operation log 1100 (Addendum: the person ID 1020 is associated with the devices 110 in accordance with the device-person correspondence table 1000 stored in the device-person correspondence table storage unit 925).

In addition, as described later, every time operation information is transmitted from a device 110 among the devices 110 associated with the person ID 1020 associated with the device operation log 1100, the device operation log 1100 is updated by the controller 900 as the need arises using a device ID, operation time information indicating the time at which an operation has been performed included in the operation information, and operation content information indicating the content of the operation.

A device ID 1110 is an identifier used to identify a device 110 and is a device ID included in transmitted operation information.

A time 1120 is information indicating a time at which an operation indicated by an operation content (to be described later) associated with the time 1120 has been performed for a device identified by the device ID associated with the time 1120, the time being included in transmitted operation information.

An operation content 1130 is information indicating the content of an operation performed for a device identified by a device ID associated with the operation content 1130 at the time indicated by the time 1120 associated with the operation content 1130, the content of the operation being indicated by operation content information included in transmitted operation information.

Returning to FIG. 9 again, the functional configuration of the device management server 160 is further described.

The leaving-home coming-home log storage unit 935 is realized by a portion of the storage region of the hard disk 870, and has a function for storing a leaving-home coming-home log 1200 created by the controller 900.

Here, as described later, for each of the person IDs 1020 included in the device-person correspondence table 1000 stored in the device-person correspondence table storage unit 925, the controller 900 creates a leaving-home coming-home log 1200 associated with the person ID 1020. Thus, the controller 900 creates leaving-home coming-home logs 1200 the number of which is the same as that of the person IDs 1020 included in the device-person correspondence table 1000 stored in the device-person correspondence table storage unit 925. Then, the leaving-home coming-home log storage unit 935 stores all the leaving-home coming-home logs 1200 created by the controller 900.

Figure 12:
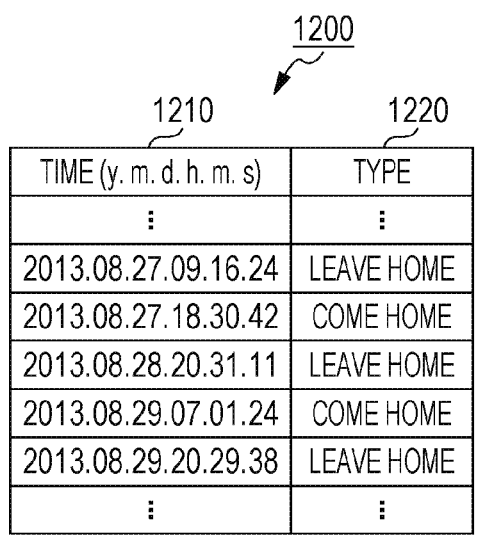
FIG. 12 is a data structure diagram illustrating an example of a leaving-home coming-home log according to the embodiment of the present disclosure.

FIG. 12 is a data structure diagram illustrating an example of a leaving-home coming-home log 1200 stored in the leaving-home coming-home log storage unit 935.

As illustrated in FIG. 12, the leaving-home coming-home log 1200 includes times 1210 and types 1220, which are associated with each other.

The leaving-home coming-home log 1200 is associated with any of the person IDs 1020 included in the device-person correspondence table 1000 stored in the device-person correspondence table storage unit 925.

Then, the leaving-home coming-home log 1200 is a log indicating a history of the times at which a person identified by the person ID 1020 associated with the leaving-home coming-home log 1200 has performed an action with which it is expected that the person has left or come home.

In addition, as described later, every time a leaving-home detection signal or a coming-home detection signal is transmitted from the electric lock 120 associated with the person ID 1020 associated with the leaving-home coming-home log 1200, the leaving-home coming-home log 1200 is updated by the controller 900 as the need arises using leaving-home time information or coming-home time information included in the signal (Addendum: the person ID 1020 is associated with the electric lock 120 in accordance with the device-person correspondence table 1000 stored in the device-person correspondence table storage unit 925).

A type 1220 is information indicating either "leave home" indicating that a certain operation has been performed with which it is expected a person has left home from indoors to outdoors or "come home" indicating that a certain operation has been performed with which it is expected that a person has come home from outdoors to indoors. The type 1220 indicates "leave home" in the case where a leaving-home detection signal has been transmitted from the electric lock 120 and "come home" in the case where a coming-home detection signal has been transmitted from the electric lock 120.

A time 1210 is information indicating a time at which an operation indicated by "leave home" or an operation indicated by "come home" indicated by a type 1220 associated with the time 1210 has been performed. That is, the time 1210 is information indicating the time indicated by the leaving-home time information included in the leaving-home detection signal transmitted from the electric lock 120 or the time indicated by the coming-home time information included in the coming-home detection signal transmitted from the electric lock 120.

Returning to FIG. 9 again, the functional configuration of the device management server 160 is further described.

The always-on device specifying unit 940 is realized by the CPU 800, which executes a program. The always-on device specifying unit 940 is controlled by the controller 900, and has a function for specifying devices 110 operated in the state in which the main power switch is always turned on, using the device operation logs 1100 stored in the device operation log storage unit 930. In addition, the always-on device specifying unit 940 has a function for updating, in the case where the devices 110 are specified that are operated in the state in which the main power switch is always turned on, the device-person correspondence table 1000 stored in the device-person correspondence table storage unit 925. The updating the device-person correspondence table 1000 is, for example, to overwrite the always-on flags 1050 associated with the device IDs 1040, in the device-person correspondence table 1000, used to identify the specified devices 110 with a logical value of "1".

The histogram storage unit 945 is realized by a portion of the storage region of the hard disk 870, and has a function for storing a histogram created by the controller 900.

Here, as described later, for each of the device IDs 1040 associated with always-on flags 1050 having a logical value of "0" among the device IDs 1040 included in the device-person correspondence table 1000 stored in the device-person correspondence table storage unit 925, the controller 900 creates a histogram associated with the device ID 1040. Thus, the controller 900 creates histograms the number of which is the same as that of the device IDs 1040 associated with the always-on flags 1050 having a logical value of "0". Then, the histogram storage unit 945 stores the histograms created by the controller 900.

In the following, the histograms stored in the histogram storage unit 945 will be described.

Each of the histograms stored in the histogram storage unit 945 corresponds to a corresponding one of the devices 110, which are targets, and is a histogram of the time difference between an operation time and a leaving-home time first detected after the operation time, the histogram indicating the frequency of time differences in units of 15 minutes, the operation time being a time at which an operation for turning off the main power switch of the device 110 has been performed, the leaving-home time being a time at which a state has been entered in which it is expected that a person has left home where the device 110 is arranged.

Figure 13A:
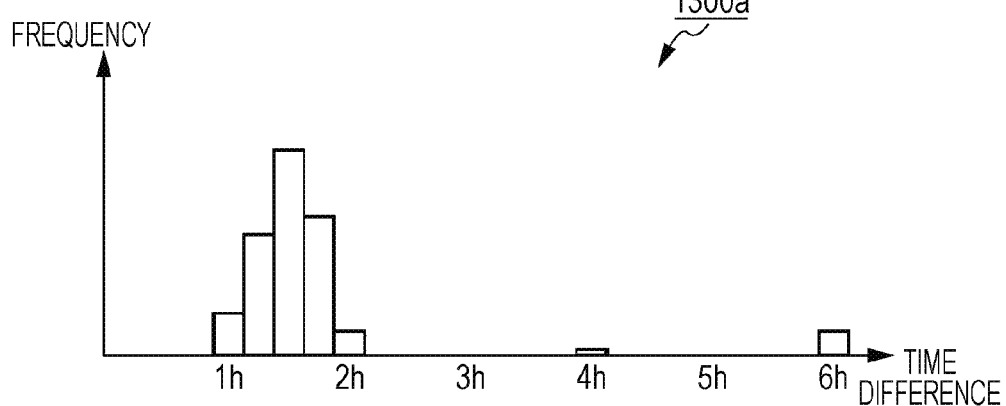
FIG. 13A is a diagram of an example of a histogram according to the embodiment of the present disclosure.
Figure 13B:
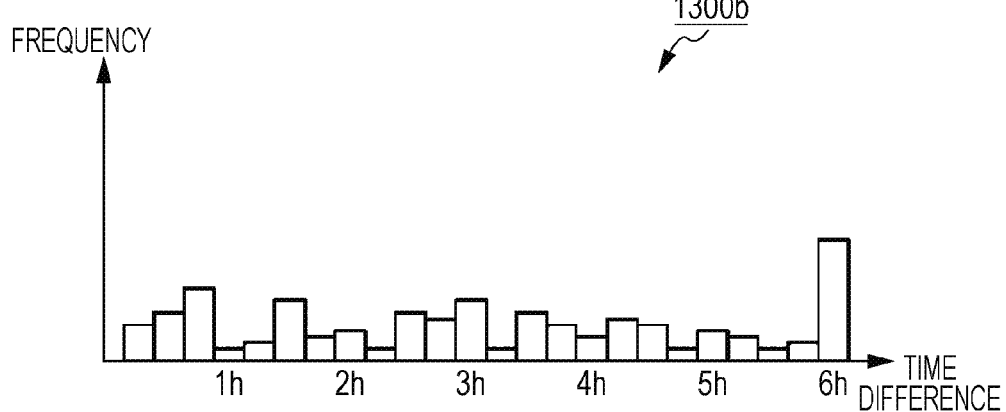
FIG. 13B is a diagram of an example of a histogram according to the embodiment of the present disclosure.
Figure 13C:
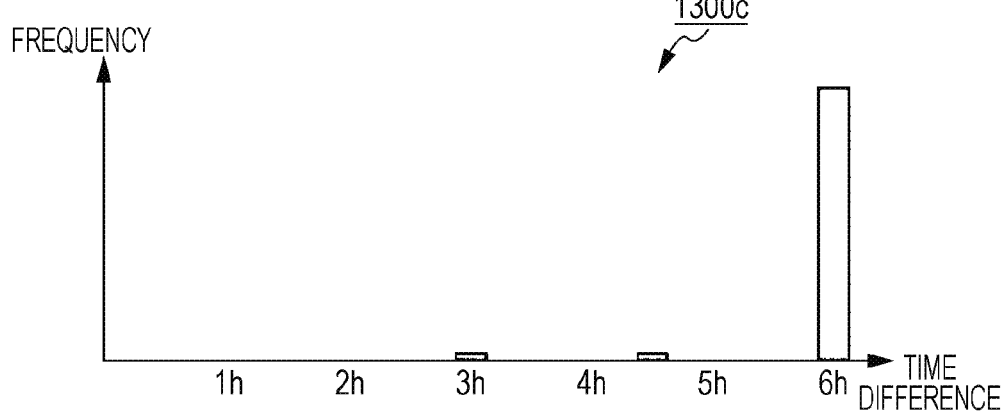
FIG. 13C is a diagram of an example of a histogram according to the embodiment of the present disclosure.

FIGS. 13A, 13B, and 13C are graphs each provided so as to visually facilitate understanding of an example of a histogram stored in the histogram storage unit 945.

FIG. 13A is a graph illustrating an example of a histogram of a dryer whose device ID is D78-bbb678. (Hereinafter this histogram is referred to as a "D78-bbb678 (dryer) histogram 1300a".) FIG. 13B is a graph illustrating an example of a histogram of a television whose device ID is T98-zyx987. (Hereinafter this histogram is referred to as a "T98-zyx987 (television) histogram 1300b".) FIG. 13C is a graph illustrating an example of a histogram of a microwave whose device ID is W34-lmn321. (Hereinafter this histogram is referred to as a "W34-lmn321 (microwave) histogram 1300c".)

In FIGS. 13A, 13B, and 13C, the horizontal axes of the graphs represent the time difference between an operation time and a leaving-home time first detected after the operation time, the operation time being a time at which an operation for turning off the main power switch of a certain device 110, which is a target (for example, the dryer whose device ID is D78-bbb678 in FIG. 13A), has been performed, the leaving-home time being a time at which a state has been entered in which it is expected that a person has left home where the device 110 is arranged. The vertical axes represent, for each of the time differences in units of 15 minutes, the frequency of events corresponding to the time difference and having entered a state in which it is expected that a person has left home where the device 110 is arranged after the operation for turning off the main power switch of the device 110, which is a target, has been performed.

Here, for each of the histograms stored in the histogram storage unit 945, in the case where the time difference between a time at which the operation for turning off the main power switch of the device 110, which is a target, is performed and a time at which, after the operation for turning off the main power switch of the device 110 has been performed, a state is first entered in which it is expected that a person has left home where the device 110 is arranged is a certain time T2 (for example, six hours) or longer, the time difference is set to the certain time T2 across the board.

For each of the histograms stored in the histogram storage unit 945, a person's behavior pattern after the person has performed an operation for turning off the power switch of a device 110 corresponding to the histogram until the person leaves home is reflected in the histogram, the device 110 being arranged in the person's home.

For example, in the case where a person has used the dryer corresponding to D78-bbb678 and arranged in the person's home, a behavior pattern indicating that the person leaves home at a high frequency in a certain time period around the time after 1.5 hours after using the dryer is reflected in the D78-bbb678 (dryer) histogram 1300a illustrated in FIG. 13A.

In addition, for example, in the case where the person has stopped watching the television corresponding to T98-zyx987 and arranged in the person's home, a behavior pattern indicating that if the person leaves home thereafter, the person leaves home in a certain time period not particularly relevant to the time at which the person has stopped watching the television is reflected in the T98-zyx987 (television) histogram 1300b illustrated in FIG. 13B.

Furthermore, for example, in the case where the person has used the microwave corresponding to W34-lmn321 and arranged in the person's home, a behavior pattern indicating that the person seldom leaves home within a time period of six hours after using the microwave, that is, in most times the person stays at home until six hours have passed after using the microwave is reflected in the W34-lmn321 (microwave) histogram 1300c illustrated in FIG. 13C.

Returning to FIG. 9 again, the functional configuration of the device management server 160 is further described.

The correlation calculation unit 950 is realized by the CPU 800, which executes a program. The correlation calculation unit 950 is controlled by the controller 900, and has the following two functions.

A correlation histogram specification function: a function for calculating a variance in time difference for each of the histograms stored in the histogram storage unit 945 and specifying histograms whose calculated variance is less than or equal to a certain value as correlation histograms.

A cumulative histogram creation function: a function for creating, in the case where a histogram is specified as a correlation histogram, a cumulative histogram for the correlation histogram.

In the following, a cumulative histogram created by the correlation calculation unit 950 will be described.

Note that, here, description will be made assuming that in the case where the correlation calculation unit 950 has calculated a variance in time difference for the D78-bbb678 (dryer) histogram 1300a (see FIG. 13A), the value of the calculated variance is less than or equal to a certain value.

A cumulative histogram created by the correlation calculation unit 950 corresponds to a certain device 110, which is a target, and is a histogram of the time difference between an operation time and a leaving-home time first detected after the operation time, the histogram indicating the cumulative frequency of time differences in units of 15 minutes, the operation time being a time at which an operation for turning off the main power switch of the device 110 has been performed, the leaving-home time being a time at which a state has been entered in which it is expected that a person has left home where the device 110 is arranged.

Figure 14:
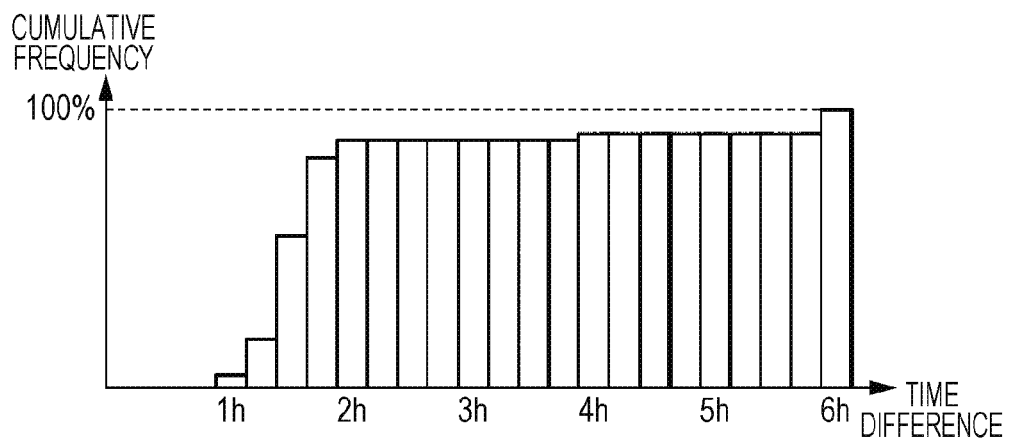
FIG. 14 is a diagram of an example of a cumulative histogram according to the embodiment of the present disclosure.

FIG. 14 is a graph provided so as to visually facilitate understanding of an example of a cumulative histogram created by the correlation calculation unit 950.

FIG. 14 is a graph illustrating a cumulative histogram for the D78-bbb678 (dryer) histogram 1300a (see FIG. 13A). (Hereinafter this cumulative histogram is referred to as a "D78-bbb678 (dryer) cumulative histogram".)

In FIG. 14, the horizontal axis of the graph represents the time difference between an operation time and a leaving-home time first detected after the operation time, the operation time being a time at which an operation for turning off the main power switch of a certain device 110, which is a target (here, for example, the dryer whose device ID is D78-bbb678), has been performed, the leaving-home time being a time at which a state has been entered in which it is expected that a person has left home where the device 110 is arranged. Then, the vertical axis represents, in a time period from a time difference of 0 to a certain time difference in units of 15 minutes, the frequency of events having entered a state in which it is expected that a person has left home where the device 110 is arranged after the operation for turning off the main power switch of the device 110, which is a target, has been performed. (Hereinafter, this frequency is referred to as a "cumulative frequency".)

Here, this cumulative frequency is expressed as a percentage in such a manner that the cumulative frequency obtained at a point in time at which the time difference is six hours is normalized to 100%. Thus, in a cumulative histogram calculated by the correlation calculation unit 950, when attention is paid to a certain specific time difference, it is clear that the cumulative frequency for the certain specific time difference indicates a probability that a person has already left home where a certain device 110, which is a target, is arranged at a point in time at which a time equivalent to the specific time difference has passed from the time at which a certain operation has performed for the device 110, which is a target.

Then, from the D78-bbb678 (dryer) cumulative histogram 1300a, it is clear that in the case where an operation for turning off the main power switch of the dryer whose device ID is D78-bbb678 has been performed in the past, the probability is relatively high that a person has left home where the dryer is arranged at or after the time at which two hours have passed from performance of the operation.

Returning to FIG. 9 again, the functional configuration of the device management server 160 is further described.

The cumulative histogram storage unit 955 is realized by a portion of the storage region of the hard disk 870. The cumulative histogram storage unit 955 has a function for storing cumulative histograms created by the correlation calculation unit 950.

The probability calculation unit 960 is realized by the CPU 800, which executes a program. The probability calculation unit 960 is controlled by the controller 900. The probability calculation unit 960 has a function for calculating, in the case where a person ID 1020 and a specified time have been specified, an in-home-presence probability for the specified time for a person's home, the person being identified by the person ID 1020, using a cumulative histogram stored in the cumulative histogram storage unit 955.

A method for calculating an in-home-presence probability will be described later in detail using a flowchart in the section of <In-home-presence Probability Calculation Process>.

The controller 900 is realized by the CPU 800, which executes a program. The controller 900 has a function for controlling the home gateway communication unit 910, the delivery company server communication unit 915, the input unit 920, the device operation log storage unit 930, the leaving-home coming-home log storage unit 935, the always-on device specifying unit 940, the device-person correspondence table storage unit 925, the histogram storage unit 945, the correlation calculation unit 950, the cumulative histogram storage unit 955, and the probability calculation unit 960 and causing the device management server 160 to realize the device operation log creation function, the leaving-home coming-home log creation function, the always-on device exclusion function, the histogram creation function, the cumulative histogram creation function, and the in-home-presence probability calculation function described above.

The controller 900 has furthermore the following five functions.

A device-person correspondence table creation function: a function for creating a device-person correspondence table 1000 in accordance with an input operation performed on the input unit 920 by an administrator of the device management server 160.

A device operation log creation function: a function for creating, for each of the person IDs 1020 included in the device-person correspondence table 1000 stored in the device-person correspondence table storage unit 925, a device operation log 1100 associated with the person ID 1020, in accordance with an input operation performed on the input unit 920 by an administrator of the device management server 160.

Here, device operation logs 1100 created by the controller 900 are updated by the controller 900 as the need arises in accordance with a device operation log update function to be described later.

The device operation log update function: a function for updating, every time operation information is transmitted from a device 110 (or every time operation information is received), a device operation log 1100 corresponding to a person ID 1020 as the need arises using a device ID, operation time information, and operation content information included in the operation information, the person ID 1020 being associated with the device ID included in the operation information, the operation time indicating a time at which an operation has been performed, the operation content information indicating the content of the operation.

A leaving-home coming-home log creation function: a function for creating, for each of the person IDs 1020 included in the device-person correspondence table 1000 stored in the device-person correspondence table storage unit 925, a leaving-home coming-home log 1200 associated with the person ID 1020, in accordance with an input operation performed on the input unit 920 by an administrator of the device management server 160.

Here, leaving-home coming-home logs 1200 created by the controller 900 are updated by the controller 900 as the need arises in accordance with a leaving-home coming-home log update function.

The leaving-home coming-home log update function: a function for updating, every time a leaving-home detection signal or a coming-home detection signal is transmitted from an electric lock 120 (or every time a leaving-home detection signal or a coming-home detection signal is received), a leaving-home coming-home log 1200 for a person ID 1020 as the need arises using leaving-home time information or coming-home time information included in the signal, the updating being performed by the controller 900, the person ID 1020 being associated with an electric lock ID included in the signal.

An operation to be performed by the in-home-presence probability calculation system 100 having the above-described configuration will be described with reference to the drawings.

<Operation>

The in-home-presence probability calculation system 100 performs, as a characteristic operation, the leaving-home coming-home detection process, the always-on device exclusion process, the histogram creation process, the cumulative histogram creation process, and the in-home-presence probability calculation process.

In addition, the in-home-presence probability calculation system 100 performs the home delivery process in cooperation with the delivery company server 180 and the distributor server 190.

In the following, these processes will be described in a certain order.

<Home Delivery Process>

Before describing details of the home delivery process, the functions of the delivery company server 180 and the distributor server 190 will first be described.

The distributor server 190 is, for example, a server apparatus managed by a distributor who sells products. The distributor server 190 receives, for example, information for purchasing a product from user. The distributor server 190 transmits, for example, request information to the delivery company server 180. The request information is information for requesting the delivery company server 180 to deliver the product from a delivery company to a home where the user lives. The distributor server 190 is, for example, a computer equipped with a processor, a storage device, and a communication circuit. The computer serves as the distributor server 190 by reading a program stored in the storage device and causing the processor to execute the program. The storage device includes, for example, either a memory or a hard disk, or a combination of a memory and a hard disk. The memory includes any one of a RAM, a ROM, and a flash memory, or a combination of two or more of a RAM, a ROM, and a flash memory. The distributor server 190 has the following three functions.

An order-taking function: a function for obtaining, from a user, product information used to specify a product desired to be purchased, user information necessary for purchasing a product, and a person ID 1020 of the user via the Internet or the like.

A settlement-of-account function: a function for performing, in the case where product information on a product and user information have been obtained, a settlement-of-account process for the product using the product information and the user information.

A delivery request function: a function for transmitting, about a product for which a settlement-of-account process has been performed, product information, user information, and a person ID 1020 for the product to the delivery company server 180 in order to request delivery of the product from a delivery company.

The delivery company server 180 is, for example, an apparatus that uses the in-home-presence probability calculation system 100, especially the device management server 160. The delivery company server 180 is, for example, a server apparatus used by a delivery company that delivers products.

The delivery company server 180 is, for example, a computer equipped with a processor, a storage device, and a communication circuit. The computer serves as the delivery company server 180 by reading a program stored in the storage device and causing the processor to execute the program. The storage device includes, for example, either a memory or a hard disk, or a combination of a memory and a hard disk. The memory includes any one of a RAM, a ROM, and a flash memory, or a combination of two or more of a RAM, a ROM, and a flash memory. The delivery company server 180 has the following four functions.

A delivery expected time calculation function: a function for receiving product information, user information, and a person ID 1020 from the distributor server 190, adjusting a delivery schedule, and calculating a specified time, which is a delivery expected time at which a product specified by the product information is delivered to a delivery destination indicated by the user information. The delivery destination is, for example, a home where the user lives.

An in-home-presence probability calculation request function: a function for transmitting, in the case where a specified time is calculated, the specified time and a person ID 1020 received from the distributor server 190 to the device management server 160 in order to request calculation of an in-home-presence probability that a person is at home, a delivery destination, at the specified time from the in-home-presence probability calculation system 100 and receiving an in-home-presence probability returned from the device management server 160 as a response signal in response to the transmission.

A delivery function: a function for performing, in the case where an in-home-presence probability returned from the device management server 160 is received and the in-home-presence probability is greater than or equal to a certain value (for example, 50%), a delivery process for delivering a product which is a delivery target to a delivery destination.

A redelivery expected time calculation function: a function for adjusting, in the case where an in-home-presence probability returned from the device management server 160 is received and the in-home-presence probability is less than the certain value, a delivery schedule, postponing delivery of a product which is a delivery target, and newly calculating a specified time, which is a new delivery expected time at which delivery is performed to a delivery destination.

In the following, the content of the home delivery process will be described.

The home delivery process is a process to be performed in the case where a user purchases a product, and is a process performed after a user has purchased a product and before the product is delivered to the user.

In this home delivery process, when a user purchases a product, an in-home-presence probability that the user is at home at a delivery expected time at which the product is delivered to the user's home is calculated and the calculated in-home-presence probability is compared with a predetermined threshold. Then, the product is delivered at the delivery expected time or a delivery date and time is delayed in accordance with a comparison result. For example, in the case where the calculated in-home-presence probability is relatively high (that is, higher than the threshold or higher than or equal to the threshold), the product is delivered at the delivery expected time. In the case where the calculated in-home-presence probability is relatively low (that is, lower than or equal to the threshold or lower than the threshold), the product is not delivered at the delivery expected time and the delivery date and time is delayed.

Figure 15:
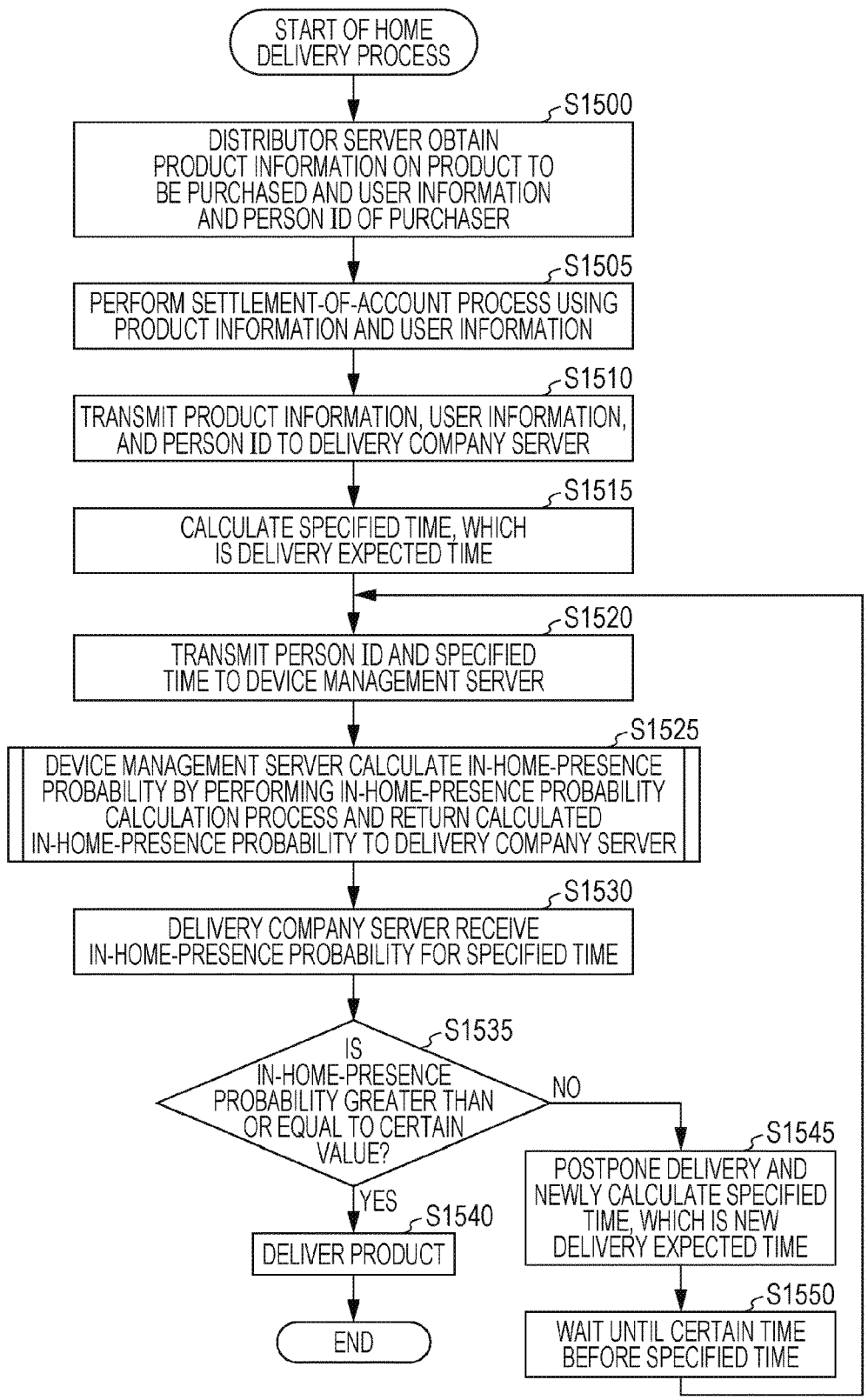
FIG. 15 is a flowchart illustrating an example of a home delivery process according to the embodiment of the present disclosure.

FIG. 15 is a flowchart illustrating an example of the home delivery process.

A home delivery process is started, for example, by that the distributor server 190 receives information used to specify a product desired to be purchased, user information necessary for purchasing the product, and a person ID 1020 of the user via the Internet or the like.

Upon start of the home delivery process, the distributor server 190 obtains the product information, the user information, and the person ID 1020, which have been transmitted (step S1500).

Upon obtaining the product information, the user information, and the person ID 1020, the distributor server 190 performs the settlement-of-account process for the product, which is a purchase target, using the obtained product information and the obtained user information (step S1505).

Upon performing the settlement-of-account process, the distributor server 190 transmits, for the product for which the settlement-of-account process has been performed, the product information, the user information, and the person ID 1020 to the delivery company server 180 in order to request delivery of the product from a delivery company (step S1510).

Then, the delivery company server 180 receives the product information, the user information, and the person ID 1020, which have been transmitted. Then, a delivery schedule is adjusted and a specified time is calculated, which is a delivery expected time at which a product specified by the product information is delivered to a delivery destination indicated by the user information (step S1515).

Upon calculating the specified time, the delivery company server 180 transmits the specified time and the person ID 1020 to the device management server 160 in order to request calculation of an in-home-presence probability that a person is at home, a delivery destination, at the specified time from the in-home-presence probability calculation system 100, the person corresponding to the person ID 1020 (step S1520).

Then, the device management server 160 receives the specified time and the person ID 1020, which have been transmitted. Then, the in-home-presence probability calculation system 100 executes the in-home-presence probability calculation process, which will be described later, calculates an in-home-presence probability, which is a probability that the person identified by the person ID 1020 is at home where the person lives at the specified time, and returns the calculated in-home-presence probability to the delivery company server 180 (step S1525).

Thereafter, the delivery company server 180 receives the returned in-home-presence probability (step S1530) and checks whether or not the in-home-presence probability is greater than or equal to a certain value (step S1535).

In processing in step S1535, in the case where the in-home-presence probability is greater than or equal to the certain value (YES in step S1535), the delivery company server 180 performs a delivery process for performing delivery to a delivery destination. Then, the delivery company delivers the product, which is a delivery target, in such a manner that the product is delivered at the delivery expected time (step S1540).

In processing in step S1535, in the case where the in-home-presence probability is less than the certain value (NO in step S1535), the delivery company server 180 adjusts the delivery schedule, postpones delivery of the product, which is a delivery target, and newly calculates a specified time, which is a new delivery expected time at which delivery is performed to the delivery destination (step S1545).

Upon calculating the specified time, the delivery company server 180 waits until a certain time before the calculated specified time (step S1550), and then processing in and after step S1520 is repeated again.

When processing in step S1540 ends, the home delivery process ends.

<Leaving-Home Coming-Home Detection Process>

The leaving-home coming-home detection process is a process performed by the in-home-presence probability calculation system 100, mainly by an electric lock 120, and is a process in which (1) in the case where a certain operation with which it is expected that a user using an electric lock 120 has left home from indoors to outdoors has been performed for the electric lock 120 by the user, the electric lock 120 creates a leaving-home detection signal and transmits the leaving-home detection signal to the device management server 160, and (2) in the case where a certain operation with which it is expected that a user using an electric lock 120 has come home from outdoors to indoors has been performed for the electric lock 120 by the user, the electric lock 120 creates a coming-home detection signal and transmits the coming-home detection signal to the device management server 160.

Figure 16:
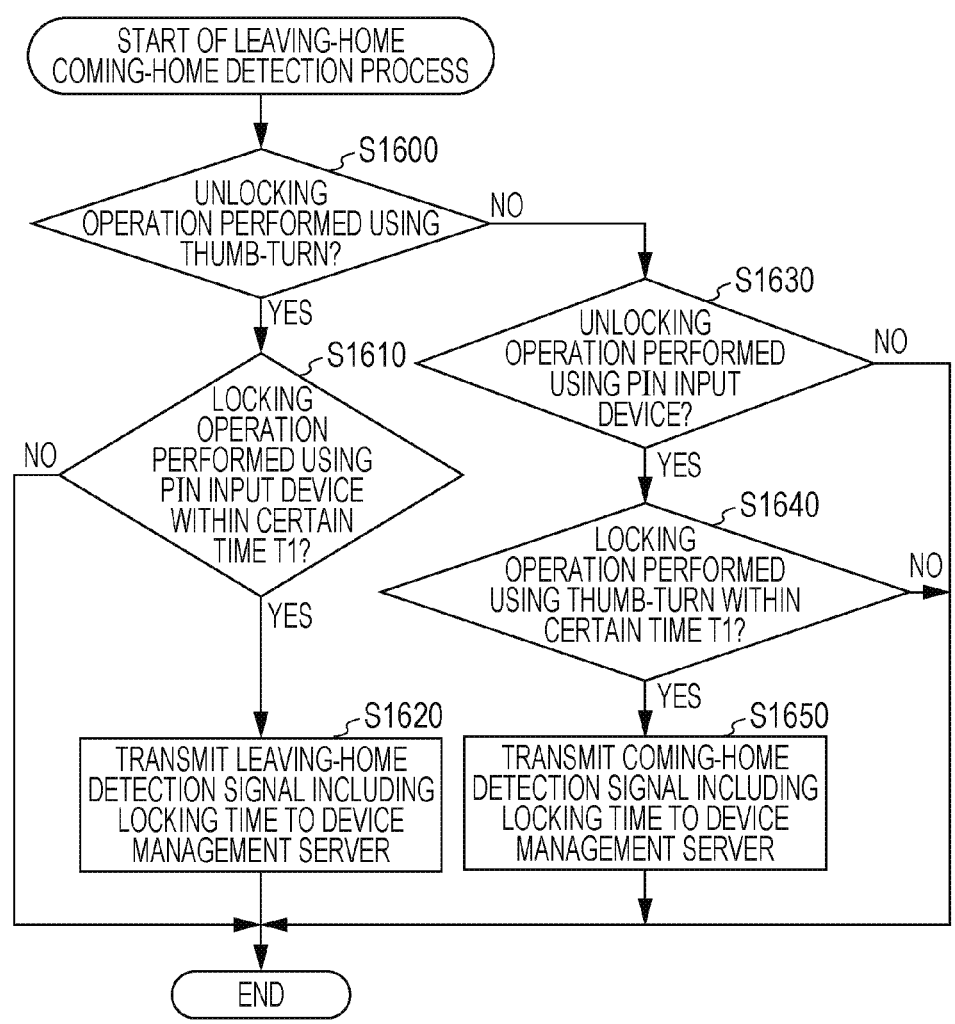
FIG. 16 is a flowchart illustrating an example of a leaving-home coming-home detection process according to the embodiment of the present disclosure.

FIG. 16 is a flowchart illustrating an example of the leaving-home coming-home detection process.

A leaving-home coming-home detection process is started by performing an unlocking operation for an electric lock 120.

Upon start of the leaving-home coming-home detection process, the leaving-home coming-home expectation unit 550 checks whether or not the unlocking operation performed for the electric lock 120 is an unlocking operation performed using the thumb-turn 420 (step S1600). Here, in the case where an unlocking operation has been performed for the electric lock 120, the leaving-home coming-home expectation unit 550 determines that the unlocking operation is an unlocking operation performed using the thumb-turn 420 (1) when thumb-turn unlocking operation time information is sent from the input unit 510, and determines that the unlocking operation is an unlocking operation performed using the PIN input device 425 (2) when PIN unlocking operation time information is sent from the input unit 510.

In processing in step S1600, in the case where the unlocking operation is an unlocking operation performed using the thumb-turn 420 (YES in step S1600), the leaving-home coming-home expectation unit 550 checks whether or not a locking operation has been performed using the PIN input device 425 within the certain time T1 after the unlocking operation has been performed using the thumb-turn 420 (step S1610).

In processing in step S1610, in the case where a locking operation has been performed using the PIN input device 425 within the certain time T1 after the unlocking operation has been performed using the thumb-turn 420 (YES in step S1610), the leaving-home coming-home expectation unit 550 determines that a certain operation with which it is expected that a user operating the electric lock 120 has left home from indoors to outdoors has been performed by the user, and creates a leaving-home detection signal including leaving-home time information indicating a time indicated by the PIN locking operation time information and the electric lock ID stored in the memory 210. Then, the communication unit 530 transmits the created leaving-home detection signal to the device management server 160 (step S1620).

In processing in step S1600, in the case where the unlocking operation is not an unlocking operation performed using the thumb-turn 420 (NO in step S1600), the leaving-home coming-home expectation unit 550 further checks whether or not the unlocking operation is an unlocking operation performed using the PIN input device 425 (step S1630).

In processing in step S1630, in the case where the unlocking operation is an unlocking operation performed using the PIN input device 425 (YES in step S1630), the leaving-home coming-home expectation unit 550 checks whether or not a locking operation has been performed using the thumb-turn 420 within the certain time T1 after the unlocking operation has been performed using the PIN input device 425 (step S1640).

In processing in step S1640, in the case where a locking operation has been performed using the thumb-turn 420 within the certain time T1 after the unlocking operation has been performed using the PIN input device 425 (YES in step S1640), the leaving-home coming-home expectation unit 550 determines that a certain operation with which it is expected that the user operating the electric lock 120 has come home from outdoors to indoors has been performed by the user, and creates a coming-home detection signal including coming-home time information indicating a time indicated by the thumb-turn locking operation time information and the electric lock ID stored in the memory 210. Then, the communication unit 530 transmits the created coming-home detection signal to the device management server 160 (step S1650).

When processing in step S1620 ends, the in-home-presence probability calculation system 100 ends the leaving-home coming-home detection process. In addition, when processing in step S1650 ends, the in-home-presence probability calculation system 100 ends the leaving-home coming-home detection process. In addition, in processing in step S1610, in the case where a locking operation is not performed using the PIN input device 425 within the certain time T1 after the unlocking operation has been performed using the thumb-turn 420 (NO in step S1610), the in-home-presence probability calculation system 100 ends the leaving-home coming-home detection process. In addition, in processing in step S1630, in the case where the unlocking operation is not an unlocking operation performed using the PIN input device 425 (NO in step S1630), the in-home-presence probability calculation system 100 ends the leaving-home coming-home detection process. In addition, in processing in step S1640, in the case where a locking operation is not performed using the thumb-turn 420 within the certain time T1 after the unlocking operation has been performed using the PIN input device 425 (NO in step S1640), the in-home-presence probability calculation system 100 ends the leaving-home coming-home detection process.

<Always-on Device Exclusion Process>

The always-on device exclusion process is a process performed by the in-home-presence probability calculation system 100, mainly by the device management server 160. The always-on device exclusion process is a process for specifying devices 110 operated in the state in which the main power switch is always turned on among the devices 110 that belong to the in-home-presence probability calculation system 100, updating the device-person correspondence table 1000 stored in the device-person correspondence table storage unit 925, and overwriting always-on flags 1050 associated with device IDs 1040 used to identify the specified devices 110 with a logical value of "1".

Figure 17:
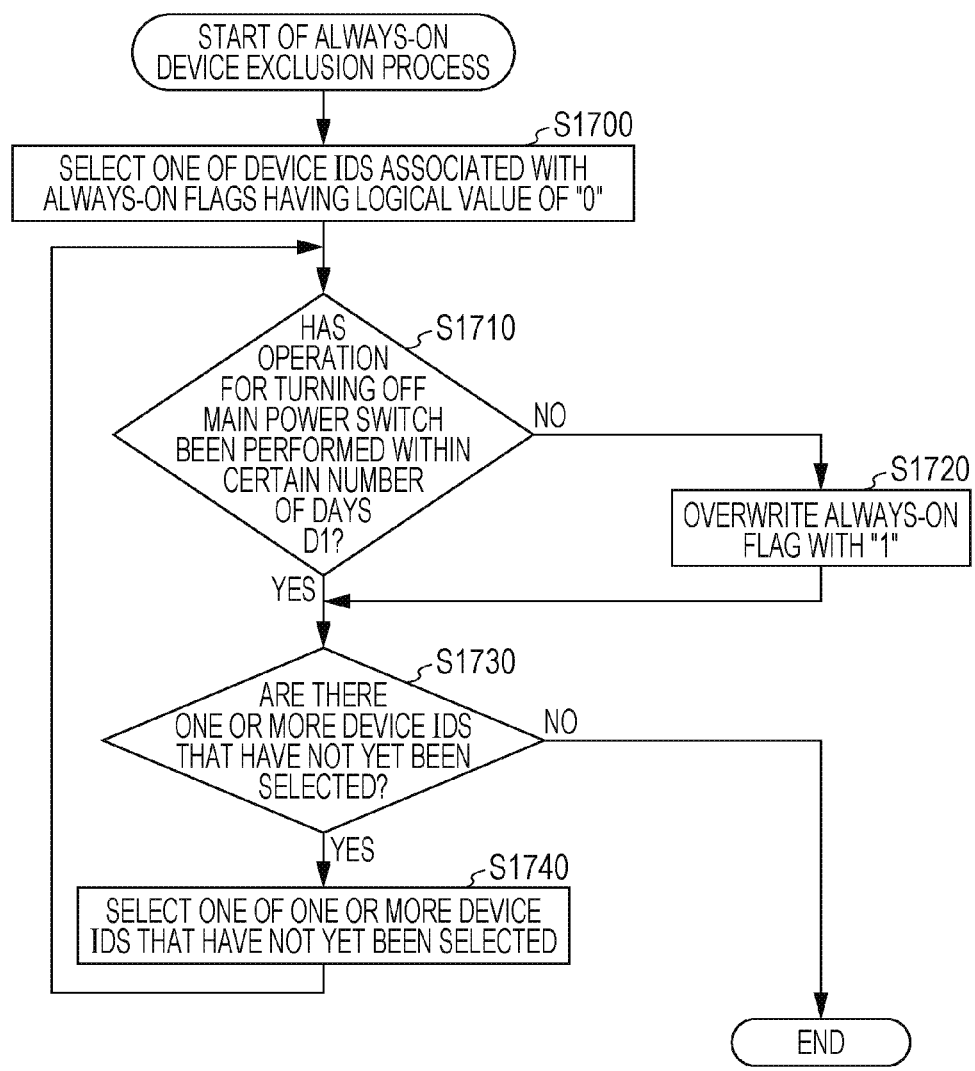
FIG. 17 is a flowchart illustrating an example of an always-on device exclusion process according to the embodiment of the present disclosure.

FIG. 17 is a flowchart illustrating an example of the always-on device exclusion process.

An always-on device exclusion process is started at a certain time (for example, at midnight) of every day, or every certain period of time (for example every 15 minutes, every 6 hours, every day).

Upon start of the always-on device exclusion process, the always-on device specifying unit 940 selects one of the device IDs 1040 associated with the always-on flags 1050 having a logical value of "0" in the device-person correspondence table 1000 stored in the device-person correspondence table storage unit 925 (step S1700).

Upon selecting one of the device IDs 1040, the always-on device specifying unit 940 checks, with reference to the device operation log 1100 stored in the device operation log storage unit 930, whether or not an operation for turning off the main power switch of the device 110 identified by the selected device ID 1040 has been performed within a certain number of days D1 (for example, 30 days), which are the past certain number of days from this point in time (step S1710).

In processing in step S1710, in the case where the operation for turning off the main power switch is not performed within the certain number of days D1 (NO in step S1710), the always-on device specifying unit 940 specifies the device 110, which is a target, as an always-on device, updates the device-person correspondence table 1000 stored in the device-person correspondence table storage unit 925. The updating the device-person correspondence table 1000 is, for example, to overwrite the always-on flag 1050 associated with the device ID 1040, in the device-person correspondence table 1000, used to identify the specified device 110 with a logical value of "1" (step S1720).

In the case where processing in step S1720 ends or in the case where the operation for turning off the main power switch has been performed within the certain number of days D1 in processing in step S1710 (YES in step S1710), the always-on device specifying unit 940 checks whether or not there are one or more device IDs 1040 that have not yet been selected among the device IDs 1040 associated with the always-on flags 1050 having a logical value of "0" in the device-person correspondence table 1000 stored in the device-person correspondence table storage unit 925 (step S1730).

In processing in step S1730, in the case where there are one or more device IDs 1040 that have not yet been selected, the always-on device specifying unit 940 selects one of the one or more device IDs 1040 that have not yet been selected (step S1740) and processing in and after step S1710 is repeated.

In processing in step S1730, in the case where there is no device ID 1040 that has not yet been selected, the in-home-presence probability calculation system 100 ends the always-on device exclusion process.

The always-on device specifying unit 940 may specify devices corresponding to device IDs for which always-on flags 1050 have a logical value of "1" as always-on devices by executing the flowchart illustrated in FIG. 17. That is, the always-on device specifying unit 940 may specify devices corresponding to device IDs 1040 for which always-on flags 1050 have a logical value of "1" and included in the device-person correspondence table 1000 stored in the device-person correspondence table storage unit 925.

Thus, a histogram to be described later may be created by excluding devices corresponding to device IDs for which always-on flags 1050 have a logical value of "1" from the device-person correspondence table 1000 and using devices corresponding to device IDs for which always-on flags 1050 have a logical value of "0".

<Histogram Creation Process>

The histogram creation process is a process performed by the in-home-presence probability calculation system 100, mainly by the device management server 160, and is a process for creating, for each of the devices 110 identified by the device IDs 1040 associated with the always-on flags 1050 having a logical value of "0", a histogram of the time difference between a time at which the main power switch of the device 110 is turned off and a time at which it is expected that a person has left home where the device 110 is arranged.

Figure 18:
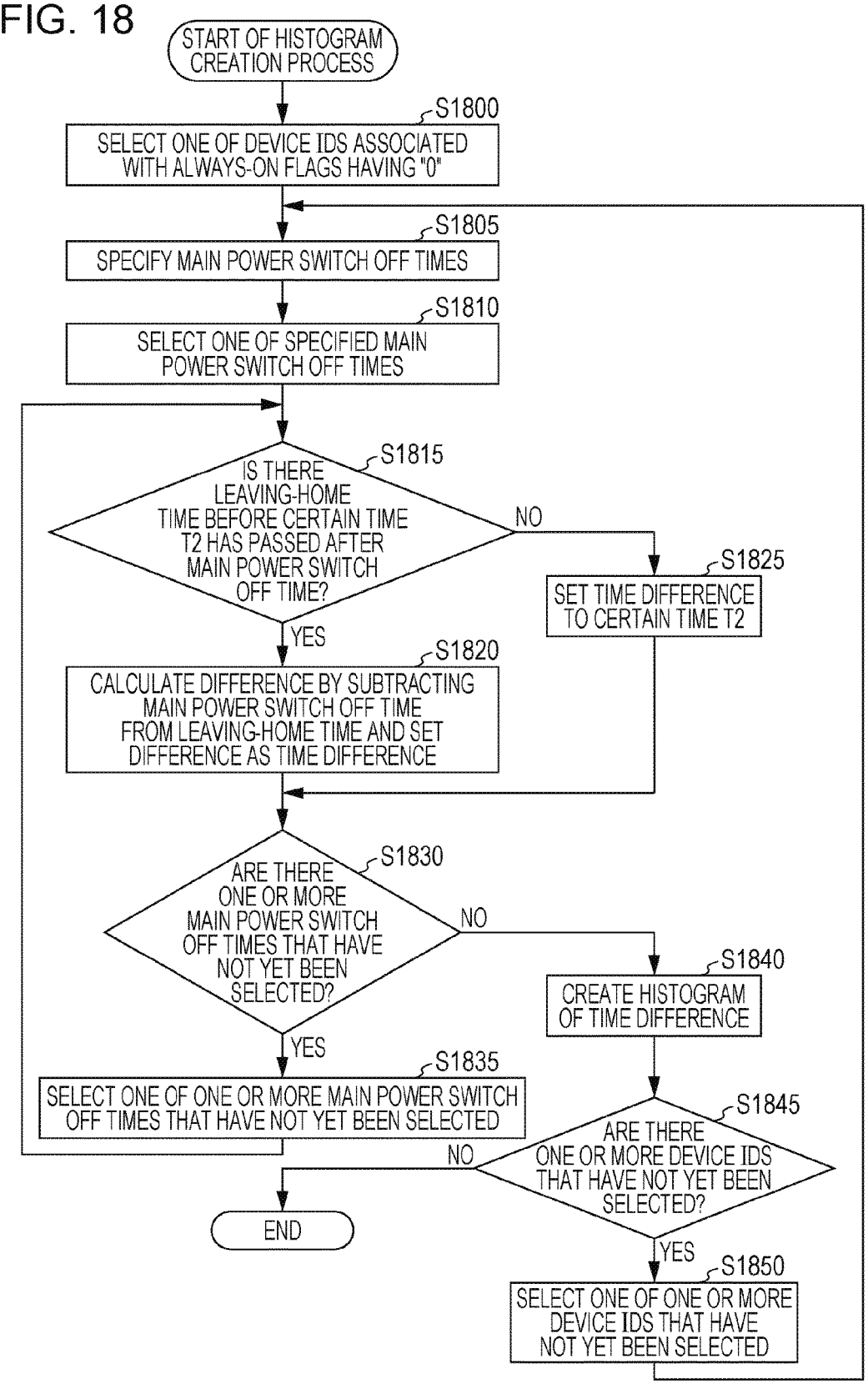
FIG. 18 is a flowchart illustrating an example of a histogram creation process according to the embodiment of the present disclosure.

FIG. 18 is a flowchart illustrating an example of the histogram creation process.

A histogram creation process is started at a certain time (for example, after completion of the always-on device exclusion process such as at 1 am) of every day or every time that the always-on device exclusion process is completed.

Upon start of the histogram creation process, the controller 900 selects one of the device IDs 1040 associated with the always-on flags 1050 having a logical value of "0" in the device-person correspondence table 1000 stored in the device-person correspondence table storage unit 925 (step S1800).

Upon selecting one of the device IDs 1040, the controller 900 specifies, for all processes performed in the past for turning off the main power switch of the device 110 identified by the selected device ID 1040, times at which the process for turning off the main power switch has been performed (hereinafter referred to as "main power switch off times") with reference to the device operation log 1100 stored in the device operation log storage unit 930 (step S1805).

Upon specifying the main power switch off times, the controller 900 selects one of the specified main power switch off times (step S1810), and checks whether or not, for the selected main power switch off time, there is a time 1210 associated with a type 1220 indicating "leave home" (hereinafter referred to as a "leaving-home time 1210") before a certain time T2 has passed after the main power switch off time with reference to a leaving-home coming-home log 1200 associated with a person ID 1020 associated with the device 110, which is a target (step S1815).

In processing in step S1815, in the case where there is such a leaving-home time 1210 (YES in step S1815), the controller 900 calculates the difference by subtracting "the selected main power switch off time" from "the leaving-home time" and sets the calculated difference as the time difference associated with the main power switch off time (step S1820).

In processing in step S1815, in the case where there is no such leaving-home time 1210 (NO in step S1815), the controller 900 sets the time difference associated with the main power switch off time to the certain time T2 (step S1825).

In the case where processing in step S1820 ends and in the case where processing in step S1825 ends, the controller 900 checks whether or not there are one or more main power switch off times that have not yet been selected (step S1830).

In processing in step S1830, in the case where there are one or more main power switch off times that have not yet been selected (YES in step S1830), the controller 900 selects one of the one or more main power switch off times that have not yet been selected (step S1835) and processing in and after step S1815 is repeated.

In processing in step S1830, in the case where there is no main power switch off time that has not yet been selected (NO in step S1830), the controller 900 creates a histogram of the calculated time differences, the histogram indicating the frequency of the calculated time differences in units of 15 minutes, associate the histogram with the selected device ID 1040, and causes the histogram storage unit 945 to store the histogram by overwriting (step S1840).

Upon causing the histogram storage unit 945 to store the created histogram, the controller 900 checks whether or not there are one or more device IDs 1040 that have not yet been selected among the device IDs 1040 associated with the always-on flags 1050 having a logical value of "0" (step S1845).

In processing in step S1845, in the case where there are one or more device IDs 1040 that have not yet been selected (YES in step S1845), the controller 900 selects one of the one or more device IDs 1040 that have not yet been selected (step S1850) and processing in and after step S1805 is repeated.

In processing in step S1845, in the case where there is no device ID 1040 that has not yet been selected (NO in step S1845), the in-home-presence probability calculation system 100 ends the histogram creation process.

<Cumulative Histogram Creation Process>

The cumulative histogram creation process is a process performed by the in-home-presence probability calculation system 100, mainly by the device management server 160, and is a process for calculating a variance in time difference for each of the histograms stored in the histogram storage unit 945, specifying a histogram whose calculated variance is less than or equal to a certain value as a correlation histogram, and creating a cumulative histogram for the specified histogram.

Figure 19:
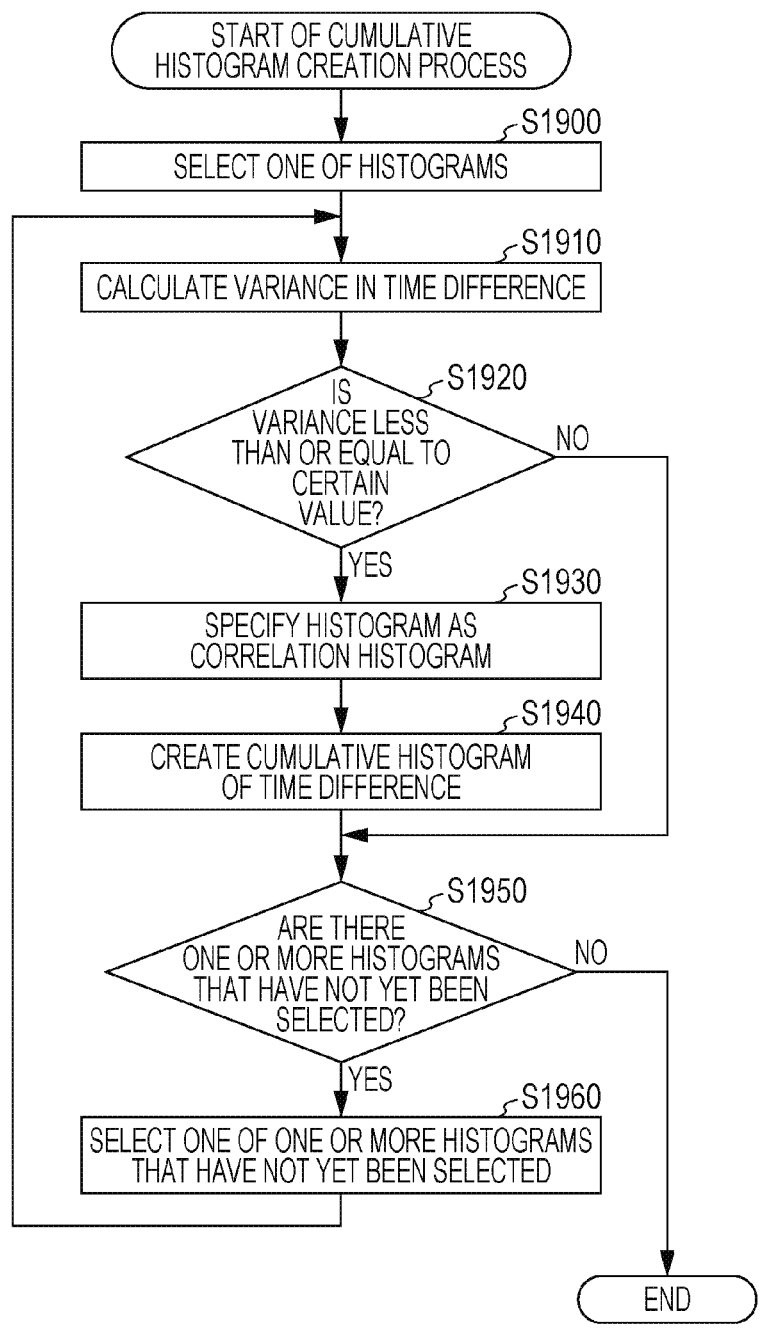
FIG. 19 is a flowchart illustrating an example of a cumulative histogram creation process according to the embodiment of the present disclosure.

FIG. 19 is a flowchart illustrating an example of the cumulative histogram creation process.

A cumulative histogram creation process is started at a certain time (for example, after completion of the histogram creation process such as at 2 am) of every day or every time that the histogram creation process is completed.

Upon start of the cumulative histogram creation process, the controller 900 selects one of the histograms stored in the histogram storage unit 945 (step S1900). Then, the controller 900 calculates a variance in time difference for the selected histogram (step S1910).

Upon calculating the variance, the controller 900 checks whether or not the calculated variance is less than or equal to the certain value (step S1920).

In processing in step S1920, in the case where the calculated variance is less than or equal to the certain value (YES in step S1920), the controller 900 specifies the selected histogram as a correlation histogram (step S1930). Then, the controller 900 creates, for the histogram specified as a correlation histogram, a cumulative histogram of cumulative frequencies in units of 15 minutes (step S1940), associates the cumulative histogram with a corresponding device ID 1040, and causes the cumulative histogram storage unit 955 to store the histogram by overwriting.

In the case where processing in step S1940 ends or in the case where the calculated variance is not less than or equal to the certain value in processing in step S1920 (NO in step S1920), the controller 900 checks whether or not there are one or more histograms that have not yet been selected among the histograms stored in the histogram storage unit 945 (step S1950).

In processing in step S1950, in the case where there are one or more histograms that have not yet been selected (YES in step S1950), the controller 900 selects one of the one or more histograms that have not yet been selected (step S1960) and processing in and after step S1910 is repeated.

In processing in step S1950, in the case where there is no histogram that has not yet been selected (NO in step S1950), the in-home-presence probability calculation system 100 ends the cumulative histogram creation process.

<In-Home-Presence Probability Calculation Process>

The in-home-presence probability calculation process is a process performed by the in-home-presence probability calculation system 100, mainly by the device management server 160. The in-home-presence probability calculation process is a process for obtaining a specified time and a person ID 1020 and calculating an in-home-presence probability for the specified time, which is a probability that the person identified by the person ID 1020 is at home where the person lives.

Figure 20:
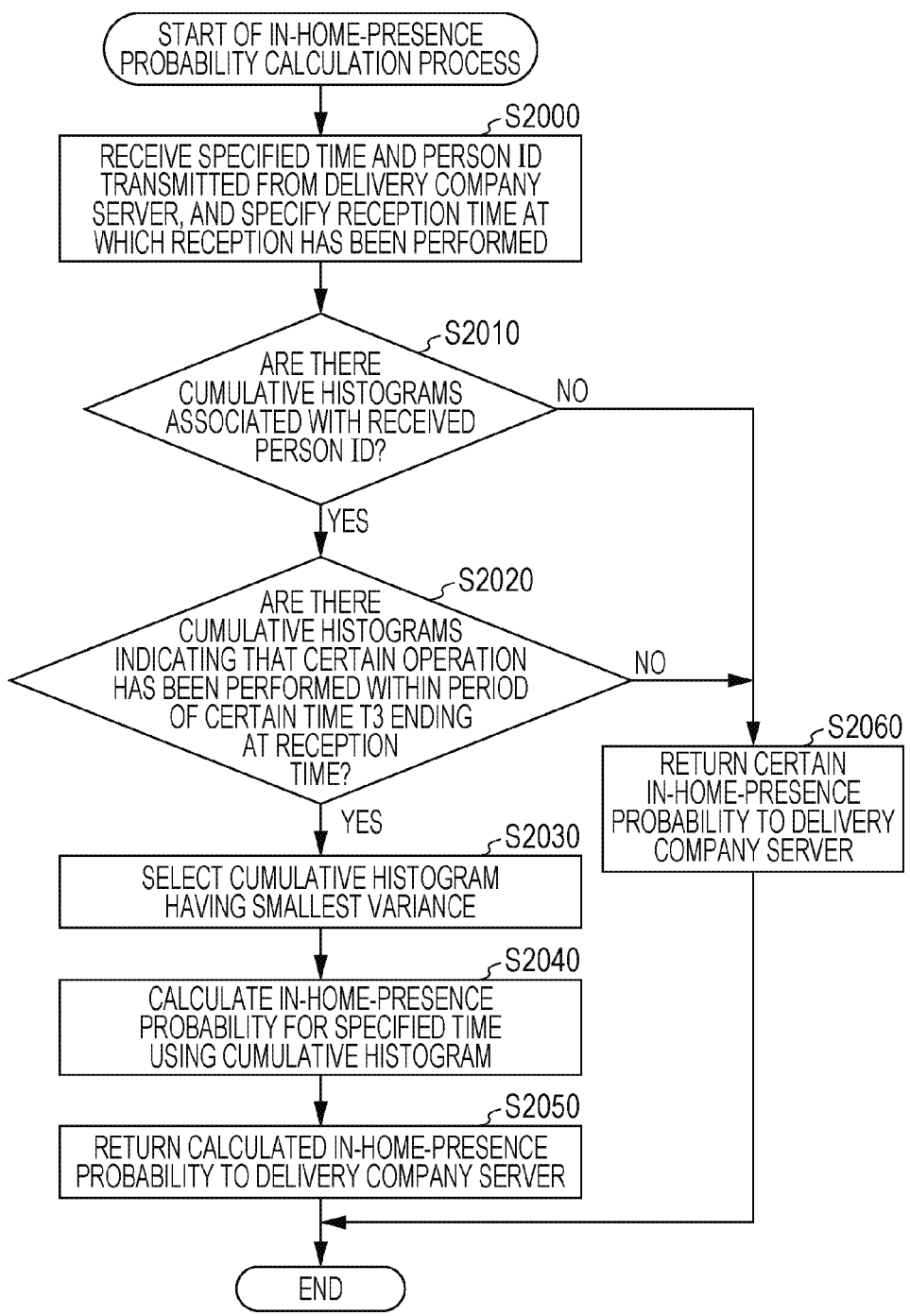
FIG. 20 is a flowchart illustrating an example of an in-home-presence probability calculation process according to the embodiment of the present disclosure.

FIG. 20 is a flowchart illustrating an example of the in-home-presence probability calculation process.

An in-home-presence probability calculation process is started as a result of transmission of a specified time and a person ID 1020 from the delivery company server 180.

Upon start of the in-home-presence probability calculation process, the delivery company server communication unit 915 receives the specified time and person ID 1020, which have been transmitted, and specifies a reception time at which reception has been performed (step S2000).

Then, the probability calculation unit 960 checks whether or not there are cumulative histograms associated with the received person ID 1020 (that is, cumulative histograms associated with device IDs 1040 associated with the received person ID 1020) among cumulative histograms stored in the cumulative histogram storage unit 955 (step S2010).

In processing in step S2010, in the case where there are cumulative histograms associated with the received person ID 1020 (YES in step S2010), the probability calculation unit 960 checks whether or not there are cumulative histograms indicating that a certain operation has been performed within a period of a certain time T3 ending at the specified reception time among the cumulative histograms associated with the devices (step S2020). Here, the certain time T3 is the time difference between the current time and the time calculated by subtracting the certain time T2 from the specified time.

In processing in step S2020, in the case where there are cumulative histograms (YES in step S2020), the probability calculation unit 960 selects a cumulative histogram having the smallest variance among the cumulative histograms indicating that a certain operation has been performed within the period of the certain time T3 ending at the specified reception time (step S2030).

Upon selecting of the cumulative histogram having the smallest variance, the probability calculation unit 960 calculates an in-home-presence probability for the specified time, which is a probability that the person identified by the person ID 1020 is at home where the person lives, using the selected cumulative histogram (step S2040).

When attention is paid to a certain specific time difference in a cumulative histogram, the cumulative frequency for the certain specific time difference indicates a probability that a person has already left home where a device 110, which is a target, is arranged for which a certain operation has been performed, at a point in time at which a time equivalent to a specific time difference has passed from the time at which the certain operation has performed for the device 110. Calculation of this in-home-presence probability is performed using this indication of the cumulative frequency for the certain specific time difference.

That is, by using a cumulative histogram and specifying a cumulative frequency for a time difference corresponding to the specified time, the probability calculation unit 960 calculates an in-home-absence probability for the specified time, which is a probability that a person has already left home where the person lives, and calculates a value by subtracting the in-home-absence probability from 100% as an in-home-presence probability for the specified time.

When the probability calculation unit 960 calculates an in-home-presence probability, the delivery company server communication unit 915 returns the calculated in-home-presence probability to the delivery company server 180 (step S2050).

In processing in step S2020, in the case where there are no cumulative histograms indicating that a certain operation has been performed within the period of the certain time T3 ending at the specified reception time (NO in step S2020), the probability calculation unit 960 sets an in-home-presence probability to a predetermined probability (for example, 50%) and the delivery company server communication unit 915 returns the set in-home-presence probability to the delivery company server 180 (step S2060).

When processing in step S2050 ends, the in-home-presence probability calculation system 100 ends the in-home-presence probability calculation process. In addition, when processing in step S2060 ends, the in-home-presence probability calculation system 100 ends the in-home-presence probability calculation process.

<Consideration>

As described above, the in-home-presence probability calculation system 100 calculates an in-home-presence probability for a specified time, which is a probability that a person is at home, which is a specific place, and provides the calculated in-home-presence probability to the delivery company server 180.

Thus, for example, a delivery company or the like using the in-home-presence probability calculation system 100 may obtain an in-home-presence probability for a delivery expected time, which is a probability that a person is at home where is a delivery destination, using the in-home-presence probability calculation system 100. Then, delivery rescheduling or the like may be performed on the basis of the obtained in-home-presence probability.

Modified Example 1

<Overview>

In the following, a first modified in-home-presence probability calculation system will be described, which is obtained by modifying a portion of the in-home-presence probability calculation system 100 in the embodiment, as an embodiment of an in-home-presence probability calculation method, a server apparatus, and an in-home-presence probability calculation system according to the present disclosure.

The in-home-presence probability calculation system 100 in the embodiment is an example illustrating a configuration with which, when a correlation histogram is specified, a histogram whose variance in time difference is less than or equal to a certain value is specified as a correlation histogram among histograms which are targets for specification.

In contrast to this, the first modified in-home-presence probability calculation system according to a modified example 1 is an example illustrating a configuration with which, when a correlation histogram is specified, a histogram whose proportion of the frequency of time differences less than the certain time T2 is less than or equal to a certain value is specified as a correlation histogram among histograms which are targets for specification.

In the following, details of this first modified in-home-presence probability calculation system will be described with reference to the drawings, mainly on differences between the first modified in-home-presence probability calculation system and the in-home-presence probability calculation system 100 in the embodiment.

<Configuration>

The first modified in-home-presence probability calculation system has a hardware configuration similar to that of the in-home-presence probability calculation system 100 in the embodiment. However, the first modified in-home-presence probability calculation system is modified in such a manner that a portion of programs stored in the memory 810 included in the device management server 160 in the embodiment is changed. As a result, the device management server 160 in the embodiment is modified into a first modified device management server.

Then, this first modified in-home-presence probability calculation system executes a modified cumulative histogram creation process (to be described later) instead of the cumulative histogram creation process performed by the in-home-presence probability calculation system 100 in the embodiment, and executes a first modified in-home-presence probability calculation process instead of the in-home-presence probability calculation process performed by the in-home-presence probability calculation system 100 in the embodiment.

The first modified device management server is modified in such a manner that the correlation calculation unit 950, which is a functional component of the device management server 160 in the embodiment, is changed to a modified correlation calculation unit.

Similarly to the correlation calculation unit 950 in the embodiment, the modified correlation calculation unit is realized by the CPU 800, which executes a program, and controlled by the controller 900. Then, the modified correlation calculation unit has the following modified correlation histogram specification function in addition to a correlation histogram creation function of the correlation calculation unit 950.

The modified correlation histogram specification function: a function for determining whether or not, for each of the histograms stored in the histogram storage unit 945, the proportion of the frequency of time differences less than the certain time T2 is less than or equal to a certain value and specifying, as a correlation histogram, a histogram whose proportion of the frequency of time differences less than the certain time T2 is less than or equal to the certain value.

In the following, a cumulative histogram created by the modified correlation calculation unit will be described.

Note that, here, description will be made assuming that the modified correlation calculation unit determines that, for the W34-lmn321 (microwave) histogram 1300c (see FIG. 13C), the proportion of the frequency of time differences less than the certain time T2 is less than or equal to the certain value.

A cumulative histogram created by the modified correlation calculation unit is a histogram of cumulative frequencies of the time difference between an operation time and a leaving-home time first detected after the operation time, in units of 15 minutes about a device 110, which is a target, the operation time being a time at which an operation for turning off the main power switch of the device 110 has been performed, the leaving-home time being a time at which a state has been entered in which it is expected that a person has left home where the device 110 is arranged.

Figure 21:
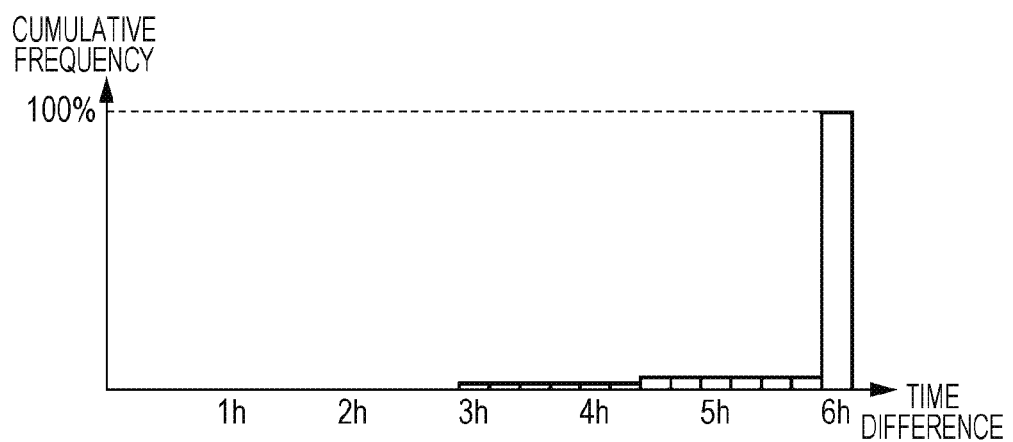
FIG. 21 is a diagram of an example of a cumulative histogram according to the embodiment of the present disclosure.

FIG. 21 is a graph provided so as to visually facilitate understanding of an example of a cumulative histogram created by the modified correlation calculation unit.

FIG. 21 is a graph illustrating an example of a cumulative histogram for the W34-lmn321 (microwave) histogram 1300c (see FIG. 13C). (Hereinafter this cumulative histogram is referred to as a "W34-lmn321 (microwave) cumulative histogram".)

In FIG. 21, the horizontal and vertical axes of the graph are similar to those of the graph of FIG. 14. The cumulative frequency in FIG. 21 is similar to that in FIG. 14.

Then, from the W34-lmn321 (microwave) cumulative histogram, it is clear that in the case where an operation for turning off the main power switch of the microwave whose device ID is W34-lmn321 has been performed in the past, the probability is relatively high that a person does not leave home, where the microwave is arranged, by the time six hours have passed from performance of the operation.

An operation to be performed by the first modified in-home-presence probability calculation system having the above-described configuration will be described with reference to the drawings.

<Operation>

The first modified in-home-presence probability calculation system executes the modified cumulative histogram creation process (to be described later) instead of the cumulative histogram creation process performed by the in-home-presence probability calculation system 100 in the embodiment, and executes the first modified in-home-presence probability calculation process instead of the in-home-presence probability calculation process performed by the in-home-presence probability calculation system 100 in the embodiment.

In the following, these processes will be described in a certain order.

<Modified Cumulative Histogram Creation Process>

The modified cumulative histogram creation process is a process obtained by modifying the cumulative histogram creation process in the embodiment in such a manner that a portion of the cumulative histogram creation process is changed.

Figure 22:
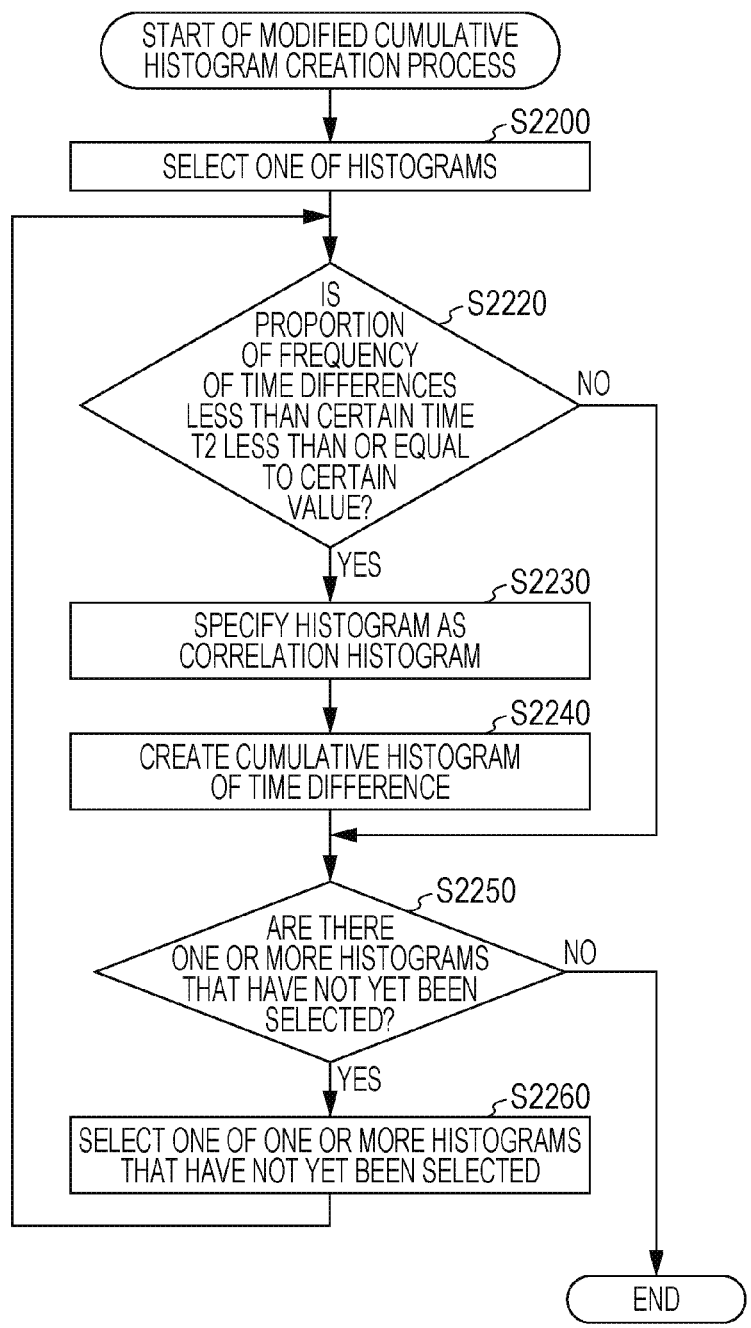
FIG. 22 is a flowchart illustrating an example of a modified cumulative histogram creation process according to the embodiment of the present disclosure.

FIG. 22 is a flowchart illustrating an example of the modified cumulative histogram creation process.

Processing in step S2200 and processing in steps S2230 to S2260 in the modified cumulative histogram creation process are similar to processing in step S1900 and processing in steps S1930 to S1960 in the cumulative histogram creation process in the embodiment (see FIG. 19), respectively. These pieces of processing have already been described, and thus the detailed description will be omitted here.

In the following, processing in step S2220 will be mainly described.

In the case where processing in step S2200 ends and in the case where processing in step S2260 ends, the controller 900 determines whether or not, for a selected histogram, the proportion of the frequency of time differences less than the certain time T2 is less than or equal to the certain value (step S2220).

In processing in step S2220, in the case where it is determined that the proportion of the frequency of time differences less than the certain time T2 is less than or equal to the certain value (YES in step S2220), the process proceeds to processing in step S2230 and the controller 900 specifies the selected histogram as a correlation histogram.

In processing in step S2220, in the case where it is determined that the proportion of the frequency of time differences less than the certain time T2 is not less than or equal to the certain value (NO in step S2220), the process proceeds to processing in step S2250 and the controller 900 checks whether or not there are one or more histograms that have not yet been selected among the histograms stored in the histogram storage unit 945.

<First Modified in-Home-Presence Probability Calculation Process>

The first modified in-home-presence probability calculation process is a process obtained by modifying the in-home-presence probability calculation process in the embodiment in such a manner that a portion of the in-home-presence probability calculation process is changed.

Figure 23:
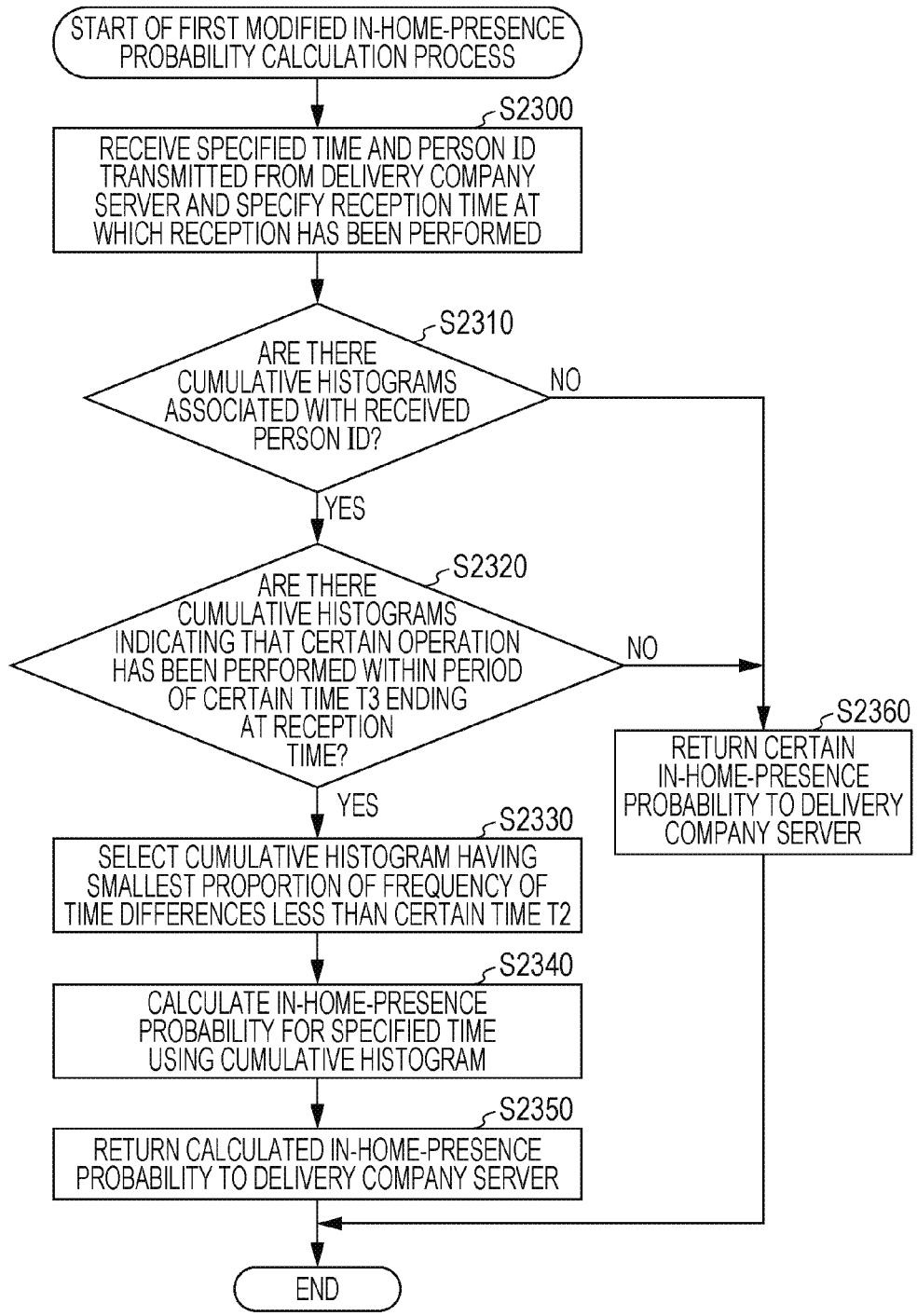
FIG. 23 is a flowchart illustrating an example of a first modified in-home-presence probability calculation process according to the embodiment of the present disclosure.

FIG. 23 is a flowchart illustrating an example of the first modified in-home-presence probability calculation process.

Processing in steps S2300 to S2320 and processing in steps S2340 to S2360 in the first modified in-home-presence probability calculation process are similar to processing in steps S2000 to S2020 and processing in steps S2040 to S2060 in the in-home-presence probability calculation process in the embodiment (see FIG. 20), respectively. These pieces of processing have already been described, and thus the detailed description will be omitted here.

In the following, processing in step S2330 will be mainly described.

In processing in step S2320, in the case where there are cumulative histograms (YES in step S2320), the probability calculation unit 960 selects a cumulative histogram having the smallest proportion of the frequency of time differences that are less than the certain time T2 among the cumulative histograms indicating that the certain operation has been performed within the period of the certain time T3 ending at the specified reception time (step S2330).

When a cumulative histogram having the smallest proportion of the frequency of time differences that are less than the certain time T2 is selected, the process proceeds to processing in step S2340 and the probability calculation unit 960 calculates an in-home-presence probability for the specified time, which is a probability that a person identified by the person ID 1020 is at home where the person lives, using the selected cumulative histogram.

Modified Example 2

<Overview>

In the following, a second modified in-home-presence probability calculation system will be described, which is obtained by modifying a portion of the in-home-presence probability calculation system 100 in the embodiment, as an embodiment of an in-home-presence probability calculation method, a server apparatus, and an in-home-presence probability calculation system according to the present disclosure.

The in-home-presence probability calculation system 100 in the embodiment is an example illustrating a configuration with which a certain operation for the devices 110 is an operation for turning off the main power switch, that is, the number of certain operations is one.

In contrast to this, the second modified in-home-presence probability calculation system according to a modified example 2 is an example illustrating a configuration with which the number of certain operations is more than one.

Here, if a device 110 is an air conditioner, certain operations are, for example, an operation for changing a cooling setting to an air-blowing setting, an operation for changing a cooling setting temperature to 28° C., and the like. If a device 110 is a recorder, certain operations are, for example, an operation for setting a recording schedule, an operation for checking details of a recording schedule, and the like.

In the following, details of this second modified in-home-presence probability calculation system will be described with reference to the drawings, mainly on differences between the second modified in-home-presence probability calculation system and the in-home-presence probability calculation system 100 in the embodiment.
<Configuration>

The second modified in-home-presence probability calculation system has a hardware configuration similar to that of the in-home-presence probability calculation system 100 in the embodiment. However, the second modified in-home-presence probability calculation system is modified in such a manner that a portion of programs stored in the memory 810 included in the device management server 160 in the embodiment is changed. As a result, the device management server 160 in the embodiment is modified into a second modified device management server.

Then, this second modified in-home-presence probability calculation system executes a modified histogram creation process (to be described later) instead of the histogram creation process performed by the in-home-presence probability calculation system 100 in the embodiment.

The second modified device management server is modified in such a manner that the controller 900, which is a functional component of the device management server 160 in the embodiment, is changed to a modified controller.

Similarly to the correlation calculation unit 950 in the embodiment, the modified controller is realized by the CPU 800, which executes a program. Among the functions of the controller 900 in the embodiment, the function for causing the device management server 160 to realize the histogram creation function is modified into a function for causing the second modified device management server to realize the following modified histogram creation function.

The modified histogram creation function: a function for controlling the second modified device management server by executing a program using the CPU 800, and causing the second modified device management server to create, for each of the devices 110, which are targets, a histogram of the time difference between each of the times at which a certain operation of the device 110 is performed and a corresponding time at which it is expected that a person has left home where the device 110 is arranged, using the created device operation log and the created leaving-home coming-home log, by causing the second modified device management server to execute the modified histogram creation process, which is a characteristic operation of the second modified device management server.

Note that the modified histogram creation process performed by the second modified device management server will be described later in detail using a flowchart in the section of <Modified Histogram Creation Process>.

An operation to be performed by the second modified in-home-presence probability calculation system having the above-described configuration will be described with reference to the drawings.
<Operation>
<Modified Histogram Creation Process>

The modified histogram creation process is a process obtained by modifying the histogram creation process in the embodiment in such a manner that a portion of the histogram creation process is changed.

Figure 24:
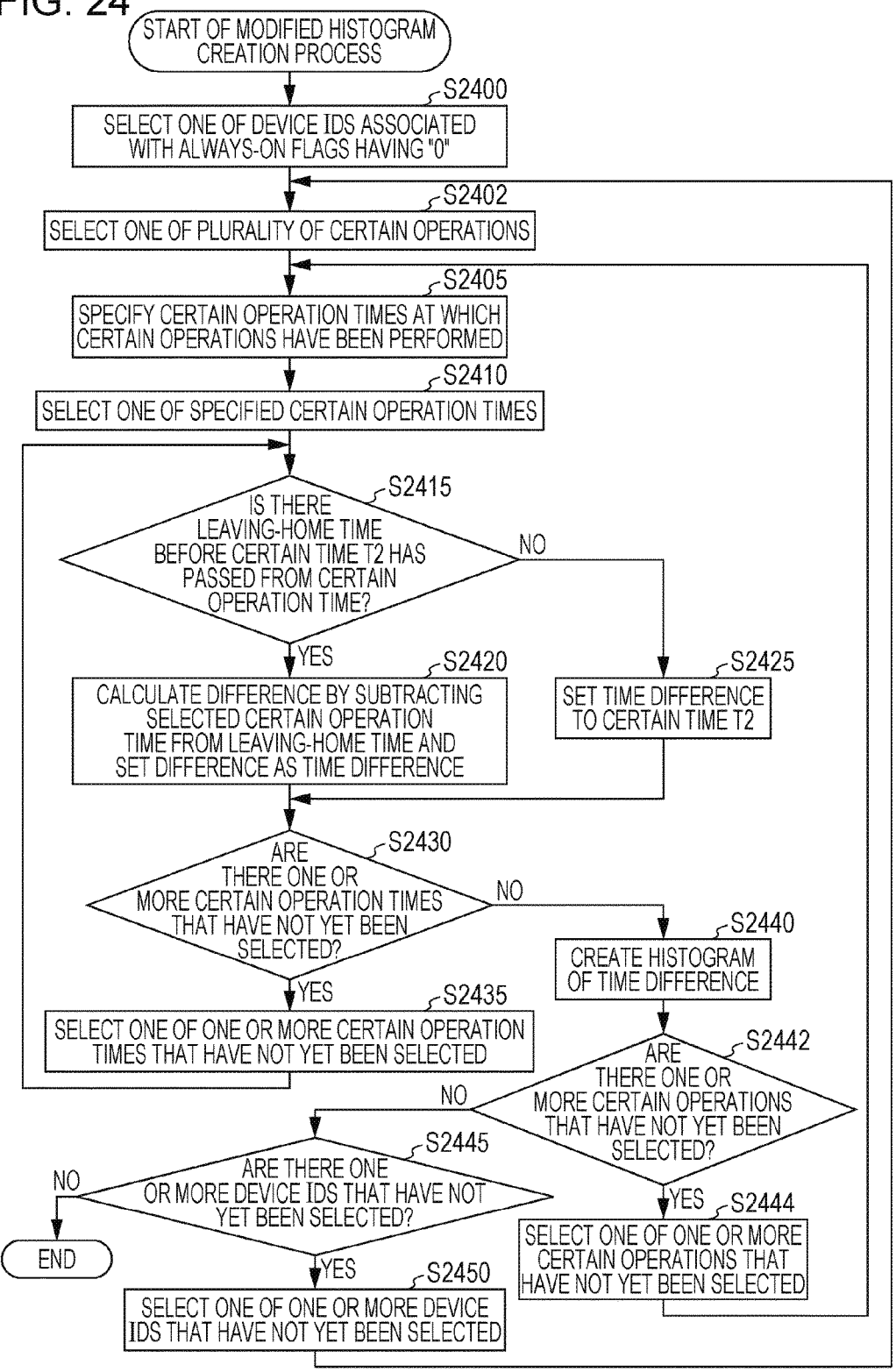
FIG. 24 is a flowchart illustrating an example of a modified histogram creation process according to the embodiment of the present disclosure.

FIG. 24 is a flowchart illustrating an example of the modified histogram creation process.

Processing in step S2400 and processing in steps S2440, S2445, and S2450 in the modified histogram creation process are similar to processing in step S1800 and processing in steps S1840 to S1850 in the histogram creation process in the embodiment (see FIG. 18), respectively. Thus, these pieces of processing have already been described.

In the following, processing in steps S2402 to S2435 and processing in steps S2442 to S2444 will be mainly described.

In processing in step S2400, when one of the device IDs 1040 associated with the always-on flags 1050 having a logical value of "0" is selected, the modified controller selects, for the selected device ID 1040, one of certain operations for a device identified by the selected device ID 1040 (step S2402). Here, for example, in the case where the second modified device management server pre-stores, for each of the devices identified by the device IDs 1040, a table in which the device is associated with certain operations for the device in a predetermined storage region of the memory 810, processing in step S2402 will be relatively easily realized.

Upon selecting a certain operation, the modified controller specifies, for all the selected certain operations performed in the past for the device 110 identified by the selected device ID 1040, the times at which the certain operations have been performed (hereinafter referred to as "certain operation times") with reference to the device operation log 1100 stored in the device operation log storage unit 930 (step S2405).

Upon specifying the certain operation times, the modified controller selects one of the specified certain operation times (step S2410), and checks whether or not, for the selected certain operation time, there is a leaving-home time 1210 indicating a time in the certain time T2 from the certain operation time with reference to the leaving-home coming-home log 1200 associated with a person ID 1020 associated with the device 110, which is a target (step S2415).

In processing in step S2415, in the case where there is such a leaving-home time 1210 (YES in step S2415), the modified controller calculates the difference by subtracting "the selected certain operation time" from "the leaving-home time" and sets the calculated difference as the time difference associated with the certain operation time (step S2420).

In processing in step S2415, in the case where there is no such leaving-home time 1210 (NO in step S2415), the modified controller sets the time difference associated with the certain operation time to the certain time T2 (step S2425).

In the case where processing in step S2420 ends or in the case where processing in step S2425 ends, the modified controller checks whether or not there are one or more certain operation times that have not yet been selected (step S2430).

In processing in step S2430, in the case where there are one or more certain operation times that have not yet been selected (YES in step S2430), the modified controller selects one of the one or more certain operation times that have not yet been selected (step S2435) and processing in and after step S2415 is repeated.

In processing in step S2430, in the case where there is no certain operation time that has not yet been selected (NO in step S2430), the modified controller creates a histogram of the calculated time differences, the histogram indicating the frequency of the calculated time differences in units of 15 minutes, associates the histogram with the selected certain operation for the selected device ID 1040, and causes the histogram storage unit 945 to store the histogram by overwriting (step S2440).

Upon causing the histogram storage unit 945 to store the created histogram, the modified controller checks whether or not there are one or more certain operations that have not yet been selected (step S2442).

In processing in step S2442, in the case where there are one or more certain operations that have not yet been selected (YES in step S2442), the modified controller selects one of the one or more certain operations that have not yet been selected (step S2444) and processing in and after step S2405 is repeated.

In processing in step S2442, in the case where there is no certain operation that has not yet been selected (NO in step S2442), the process proceeds to processing in step S2445 and the modified controller checks whether or not there are one or more device IDs 1040 that have not yet been selected among the device IDs 1040 associated with the always-on flags 1050 having a logical value of "0".

Modified Example 3

<Overview>

In the following, a third modified in-home-presence probability calculation system will be described, which is obtained by modifying a portion of the in-home-presence probability calculation system 100 in the embodiment, as an embodiment of an in-home-presence probability calculation method, a server apparatus, and an in-home-presence probability calculation system according to the present disclosure.

The in-home-presence probability calculation system 100 in the embodiment is an example illustrating a configuration in which a device 110 is arranged in a home 150 where an electric lock 120 is installed.

In contrast to this, the third modified in-home-presence probability calculation system according to a modified example 3 is an example illustrating a configuration in which a device 110 is arranged in an office where an attendance management apparatus is installed.

This attendance management apparatus creates a leaving-home detection signal in the case where all the employees working in the office where the attendance management apparatus is installed have left the office, and transmits the coming-home detection signal to the device management server 160.

In the following, details of this third modified in-home-presence probability calculation system will be described with reference to the drawings, mainly on differences between the third modified in-home-presence probability calculation system and the in-home-presence probability calculation system 100 in the embodiment.

<Configuration>

Figure 25:
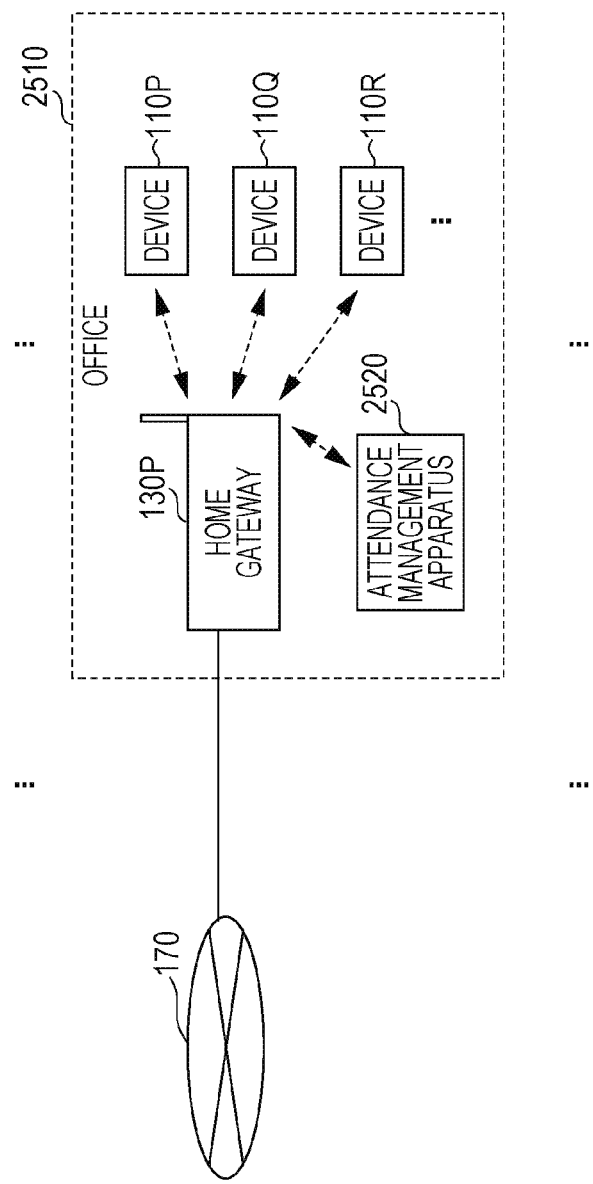
FIG. 25 is a system configuration diagram illustrating an example of the configuration of a third modified in-home-presence probability calculation system according to the embodiment of the present disclosure.

FIG. 25 is a system configuration diagram illustrating an example of the configuration of the third modified in-home-presence probability calculation system.

As illustrated in FIG. 25, the third modified in-home-presence probability calculation system is modified in such a manner that an electric lock 120 in the in-home-presence probability calculation system 100 in the embodiment is changed to an attendance management apparatus 2520.

Here, all the employees working in an office 2510 are required to wear an IC card and pass the IC card over a card reader of the attendance management apparatus 2520 when coming to the office and when leaving the office, the IC card of each of the employees storing an employee ID used to identify the employee.

When an IC card is passed over the card reader of the attendance management apparatus 2520, the attendance management apparatus 2520 records a coming-to-office time or a leaving-office time of an employee who has passed the IC card. Recorded coming-to-office times and leaving-office times of employees are used in attendance management of the employees working in the office 2510.

In the following, the attendance management apparatus 2520 will be described in detail.

Figure 26:
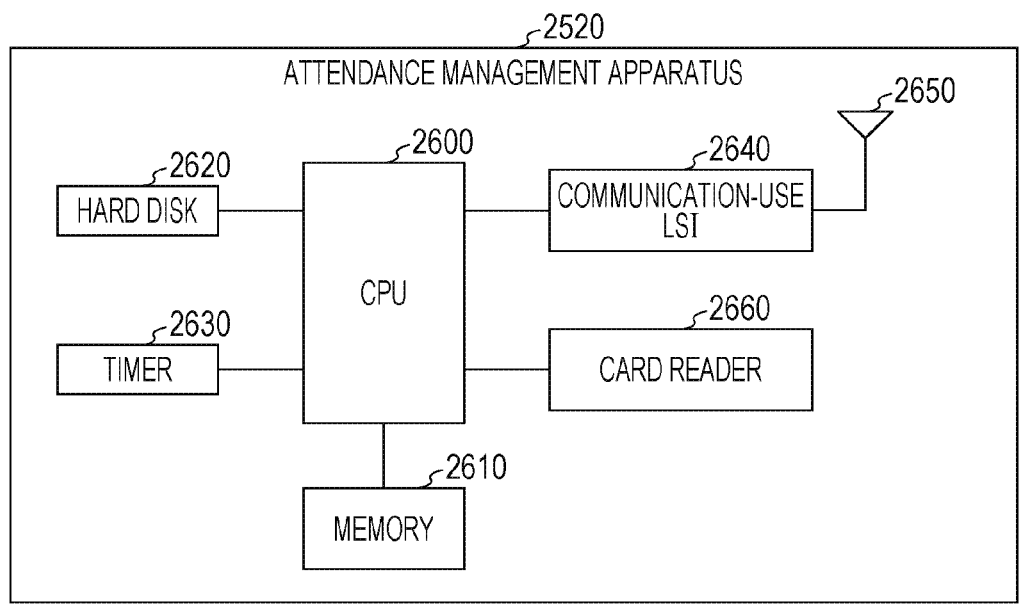
FIG. 26 is a block diagram illustrating an example of a circuit configuration of an attendance management apparatus according to the embodiment of the present disclosure.

FIG. 26 is a block diagram illustrating an example of a circuit configuration of the attendance management apparatus 2520.

As illustrated in FIG. 26, the attendance management apparatus 2520 includes, for example, a CPU 2600, a memory 2610, a hard disk 2620, a timer 2630, a communication-use LSI 2640, an antenna 2650, and a card reader 2660.

The card reader 2660 is connected to the CPU 2600. The card reader 2660 is controlled by the CPU 2600. The card reader 2660 uses a near field wireless communication technology, and has a function for reading, in the case where an employee working in the office 2510 has passed an IC card of the employee over the card reader 2660, the employee ID stored in the IC card.

The memory 2610 is connected to, for example, the CPU 2600, and includes at least any one of a RAM, a ROM, and a flash memory, or a combination of two or more of a RAM, a ROM, and a flash memory. The memory 2610 stores, for example, a program that defines an operation of the CPU 2600 and data that the CPU 2600 uses.

In addition, the memory 2610 stores an attendance management apparatus ID with which the attendance management apparatus 2520 is uniquely identified. Note that, as in the case of an electric lock ID in the embodiment, this attendance management apparatus ID is treated in the device management server 160 in the embodiment. Thus, in the case where an attendance management apparatus ID is used in the device management server 160 in the embodiment, processing to be performed by the device management server 160 may be understood by reading the attendance management apparatus ID as an electric lock ID.

The hard disk 2620 is connected to the CPU 2600. The hard disk 2620 is controlled by the CPU 2600, and has a function for storing data that the CPU 2600 uses.

The timer 2630 is connected to the CPU 2600. The timer 2630 is controlled by the CPU 2600, and has a function for measuring time.

The antenna 2650 is connected to the communication-use LSI 2640 and used for communication performed by the communication-use LSI 2640. The antenna 2650 is, for example, a metal monopole antenna.

The communication-use LSI 2640 is connected to the antenna 2650 and the CPU 2600. The communication-use LSI 2640 is controlled by the CPU 2600, and has a modulation function for modulating a transmission-use signal sent from the CPU 2600 and a transmission function for transmitting a modulated signal to the home gateway 130 using the antenna 2650.

Here, communication performed between the communication-use LSI 2640 and the home gateway 130 is based on, for example, the Bluetooth® standards.

The CPU 2600 is connected to the memory 2610, the hard disk 2620, the timer 2630, the communication-use LSI 2640, and the card reader 2660. By executing the program stored in the memory 2610, the CPU 2600 has a function for controlling the memory 2610, the hard disk 2620, the timer 2630, the communication-use LSI 2640, and the card reader 2660 and causing the attendance management apparatus 2520 to realize the following two functions.

A coming-to-office leaving-office time recording function: a function for controlling the attendance management apparatus 2520, reading an employee ID from an IC card when the IC card is passed over the card reader 2660, and recording (1) in the case where the employee ID is read for the first time for the day, a time indicated by the timer 2630 at the time of reading as a coming-to-office time of an employee identified by the employee ID in a certain storage region of the hard disk 2620 in association with the employee ID and (2) in the case where the employee ID is read for the second time for the day, a time indicated by the timer 2630 at the time of reading as a leaving-office time of the employee identified by the employee ID in a certain storage region of the hard disk 2620 in association with the employee ID.

A modified leaving-home and coming-home detection function: a function for controlling the attendance management apparatus 2520, causing the attendance management apparatus 2520 to execute the modified leaving-home coming-home detection process, causing (1) in the case where it is determined that the first employee for the day has come to the office, the attendance management apparatus 2520 to create a coming-home detection signal including information indicating a coming-to-office time of the first employee and the attendance management apparatus ID stored in the memory 2610 and to transmit the coming-home detection signal to the device management server 160 via the home gateway 130 and the network 170, and causing (2) in the case where it is determined that the last employee for the day has left the office, the attendance management apparatus 2520 to create a leaving-home detection signal including information indicating a leaving-office time of the last employee and the attendance management apparatus ID stored in the memory 2610 and to transmit the leaving-home detection signal to the device management server 160 via the home gateway 130 and the network 170.

Note that the modified leaving-home coming-home detection process performed by the attendance management apparatus 2520 will be described later in detail using a flowchart in the section of <Modified Leaving-home Coming-home Detection Process>.

Regarding an attendance management apparatus 2520 having the above-described circuit configuration, the configuration will be described from a functional aspect in the following.

Figure 27:
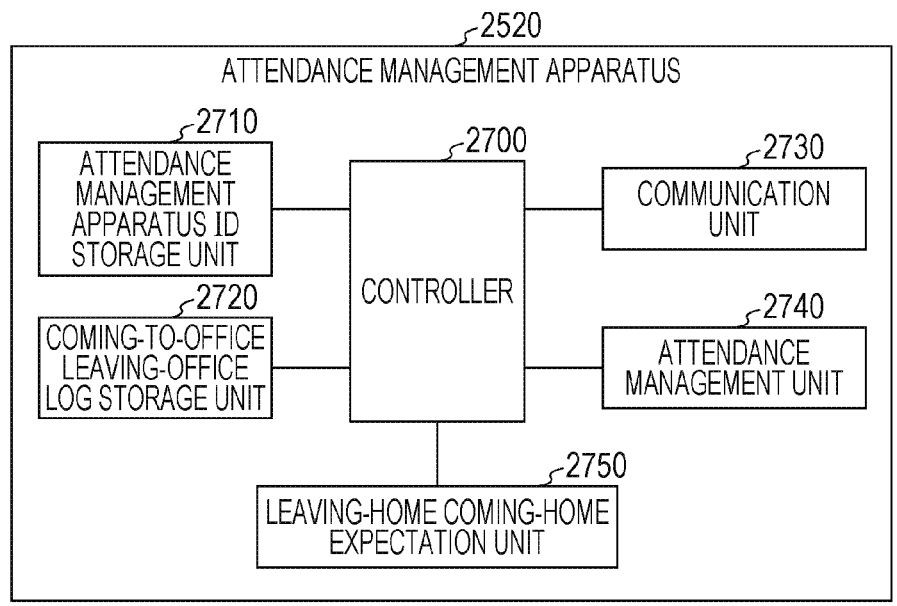
FIG. 27 is a block diagram illustrating an example of a functional configuration of the attendance management apparatus according to the embodiment of the present disclosure.

FIG. 27 is a block diagram illustrating an example of a functional configuration of the attendance management apparatus 2520.

As illustrated in FIG. 27, the attendance management apparatus 2520 includes, for example, a controller 2700, an attendance management apparatus ID storage unit 2710, a coming-to-office leaving-office log storage unit 2720, a communication unit 2730, an attendance management unit 2740, and a leaving-home coming-home expectation unit 2750.

The attendance management apparatus ID storage unit 2710 is realized by a portion of a storage region included in the memory 2610, and has a function for storing an attendance management apparatus ID.

The coming-to-office leaving-office log storage unit 2720 is realized by a portion of a storage region of the hard disk 2620 and controlled by the controller 2700, and has a function for storing a coming-to-office leaving-office log updated by the attendance management unit 2740.

Here, this coming-to-office leaving-office log is a log of coming-to-office times and leaving-office times of all the employees working in the office 2510 in a period from a certain point in time in the past to the present.

The attendance management unit 2740 is realized by the CPU 2600, which executes a program, the card reader 2660, and the timer 2630. The attendance management unit 2740 is controlled by the controller 2700 and has the following two functions.

A coming-to-office time recording function: a function for reading an employee ID from an IC card when the IC card is passed over the card reader 2660, and updating, in the case where the employee ID is read for the first time for the day, the coming-to-office leaving-office log stored in the coming-to-office leaving-office log storage unit 2720 in such a manner that the time indicated by the timer 2630 at the time of reading is treated as a coming-to-office time of an employee identified by the employee ID and added to the coming-to-office leaving-office log, the employee ID and a coming-to-office time ID being associated with each other.

A leaving-office time recording function: a function for reading an employee ID from an IC card when the IC card is passed over the card reader 2660, and updating, in the case where the employee ID is read for the second time for the day, the coming-to-office leaving-office log stored in the coming-to-office leaving-office log storage unit 2720 in such a manner that the time indicated by the timer 2630 at the time of reading is treated as a leaving-office time of an employee identified by the employee ID and added to the coming-to-office leaving-office log, the employee ID and a leaving-office time ID being associated with each other.

A leaving-home coming-home expectation unit 2750 is realized by the CPU 2600, which executes a program, and has the following two functions.

A first coming-to-office determination function: a function for checking, in the case where the coming-to-office leaving-office log stored in the coming-to-office leaving-office log storage unit 2720 is updated by the attendance management unit 2740, whether or not the update is the first update performed for the day with reference to the coming-to-office leaving-office log, determining that the first employee for the day has come to the office in the case where the update is the first update performed for the day, creating a coming-home detection signal including information indicating a coming-to-office time included in the update and the attendance management apparatus ID stored in the memory 2610, and transmitting the coming-home detection signal to the communication unit 2730 via controller 2700.

A last leaving-office determination function: a function for checking, in the case where the coming-to-office leaving-office log stored in the coming-to-office leaving-office log storage unit 2720 is updated by the attendance management unit 2740, whether or not the update indicates a leaving-office time of the last employee for whom a coming-to-office time has been recorded but a leaving-office time has not yet been recorded for the day with reference to the coming-to-office leaving-office log, determining that the last employee for the day has left the office in the case where the update indicates a leaving-office time of the last employee for whom a coming-to-office time has been recorded but a leaving-office time has not yet been recorded for the day, creating a leaving-home detection signal including information indicating a leaving-office time included in the update and the attendance management apparatus ID stored in the memory 2610, and transmitting the leaving-home detection signal to the communication unit 2730 via controller 2700.

The communication unit 2730 is realized by the CPU 2600, which executes a program, the communication-use LSI 2640, and the antenna 2650. The communication unit 2730 is controlled by the controller 2700. The communication unit 2730 has a function for communicating with the home gateway 130 in accordance with the Bluetooth® standards and a function for communicating with the device management server 160 via the home gateway 130 and the network 170.

Here, when a leaving-home detection signal or a coming-home detection signal is sent from the leaving-home coming-home expectation unit 2750, the communication unit 2730 transmits the leaving-home detection signal or the coming-home detection signal sent from the leaving-home coming-home expectation unit 2750 to the device management server 160.

The controller 2700 is realized by the CPU 2600, which executes a program. The controller 2700 has a function for controlling the attendance management apparatus ID storage unit 2710, the communication unit 2730, and the attendance management unit 2740 and causing the attendance management apparatus 2520 to realize the coming-to-office leaving-office time recording function and the modified leaving-home coming-home detection function described above.

An operation to be performed by the third modified in-home-presence probability calculation system having the above-described configuration will be described with reference to the drawings.

<Operation>

The third modified in-home-presence probability calculation system executes the modified leaving-home coming-home detection process instead of the leaving-home coming-home detection process performed by the in-home-presence probability calculation system 100 in the embodiment.

In the following, this modified leaving-home coming-home detection process will be described in a certain order.

<Modified Leaving-Home Coming-Home Detection Process>

The modified leaving-home coming-home detection process is a process performed by the third modified in-home-presence probability calculation system, mainly by the attendance management apparatus 2520. The modified leaving-home coming-home detection process is a process in which (1) in the case where it is determined that the first employee for the day has come to the office, the attendance management apparatus 2520 creates a coming-home detection signal and transmits the coming-home detection signal to the device management server 160, and (2) in the case where it is determined that the last employee for the day has left the office, the attendance management apparatus 2520 creates a leaving-home detection signal and transmits the leaving-home detection signal to the device management server 160.

Figure 28:
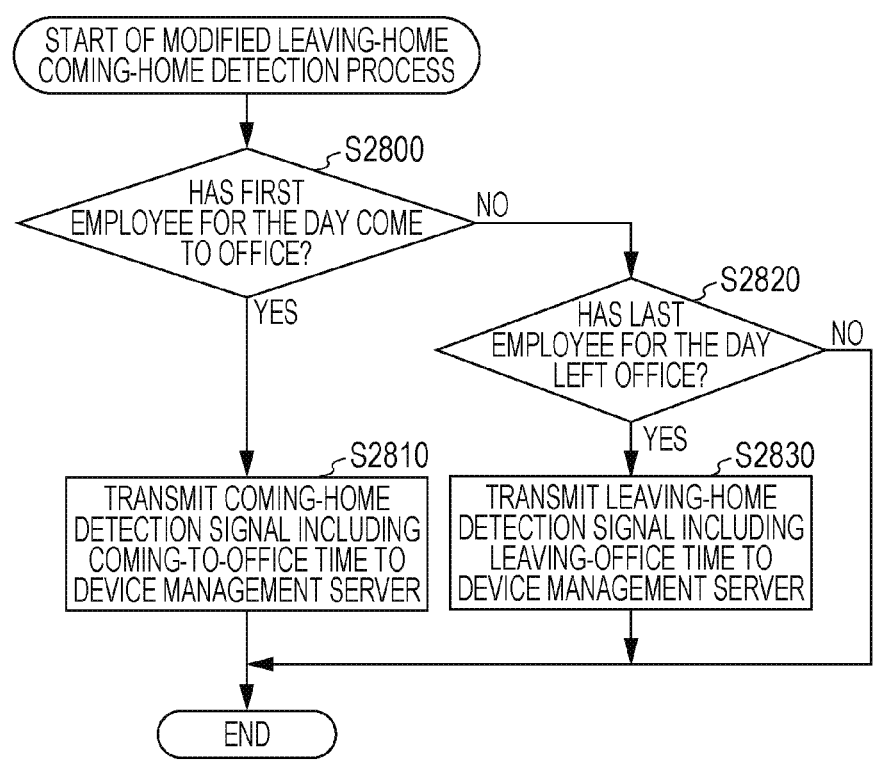
FIG. 28 is a flowchart illustrating an example of a modified leaving-home coming-home detection process according to the embodiment of the present disclosure.

FIG. 28 is a flowchart illustrating an example of the modified leaving-home coming-home detection process.

A modified leaving-home coming-home detection process is started when the attendance management unit 2740 updates the coming-to-office leaving-office log stored in the coming-to-office leaving-office log storage unit 2720.

Upon start of the modified leaving-home coming-home detection process, the leaving-home coming-home expectation unit 2750 checks whether or not the update is the first update performed for the day with reference to the updated coming-to-office leaving-office log (step S2800).

In processing in step S2800, in the case where the update is the first update performed for the day (YES in step S2800), the leaving-home coming-home expectation unit 2750 determines that the first employee for the day has come to the office and creates a coming-home detection signal including information indicating a coming-to-office time included in the update and the attendance management apparatus ID stored in the memory 2610. Then, the communication unit 2730 transmits the created coming-home detection signal to the device management server 160 (step S2810).

In processing in step S2800, in the case where the update is not the first update performed for the day (NO in step S2800), the leaving-home coming-home expectation unit 2750 checks whether or not the update indicates a leaving-office time of the last employee for whom a coming-to-office time has been recorded but a leaving-office time has not yet been recorded for the day with reference to the updated coming-to-office leaving-office log (step S2820).

In processing in step S2820, in the case where the update indicates a leaving-office time of the last employee for whom a coming-to-office time has been recorded but a leaving-office time has not yet been recorded for the day (YES in step S2820), the leaving-home coming-home expectation unit 2750 determines that the last employee for the day has left the office and creates a leaving-home detection signal including information indicating the leaving-office time included in the update and the attendance management apparatus ID stored in the memory 2610. Then, the communication unit 2730 transmits the created leaving-home detection signal to the device management server 160 (step S2830).

In processing in step S2820, in the case where the update does not indicate a leaving-office time of the last employee for whom a coming-to-office time has been recorded but a leaving-office time has not yet been recorded for the day (NO in step S2820), in the case where processing in step S2810 ends or in the case where processing in step S2830 ends, the third modified in-home-presence probability calculation system ends the modified leaving-home coming-home detection process.

<Supplement>

As described above, as embodiments of an in-home-presence probability calculation method, a server apparatus, and an in-home-presence probability calculation system according to the present disclosure, four in-home-presence probability calculation systems have been illustrated as examples and described in the embodiment, the modified example 1, the modified example 2, and the modified example 3; however, the following modifications may also be possible. As a matter of course, the present disclosure is not limited to the in-home-presence probability calculation methods, the server apparatuses, and the in-home-presence probability calculation systems illustrated in the embodiment, the modified example 1, the modified example 2, and the modified example.

(1) In the embodiment, the in-home-presence probability calculation system 100 is an example illustrating a configuration with which an electric lock 120 detects a certain operation with which it is expected that a person has left home from indoors to outdoors. In addition, in the modified example 3, the third modified in-home-presence probability calculation system is an example illustrating a configuration with which the attendance management apparatus 2520 detects that the last employee for the day has left the office. However, as long as it is possible to determine that a state has been entered in which it is expected that a person is not at home, the configuration is not limited to a configuration with which an electric lock or an attendance management apparatus detects that the state has been entered in which it is expected that a person is not at home. For example, examples are considered illustrating a configuration with which a state is detected in which it is expected that a person is not at home using a person detection sensor using a change in capacitance, the person detection sensor being arranged in the home, a configuration with which a state is detected in which it is expected that a person is not at home using a certain operation performed for a home security system of the home (for example, an operation for starting up an intruder detection device), a configuration with which a state is detected in which it is expected that a person is not at home using an operation log for a device arranged in the home, and the like.

(2) In the embodiment, the in-home-presence probability calculation system 100 is an example illustrating a configuration with which a device 110 and an electric lock 120 communicate with the device management server 160 via the home gateway 130 and the network 170. However, as long as the device 110 and the electric lock 120 may communicate with the device management server 160, the configuration is not limited to a configuration with which communication is performed via the home gateway 130 and the network 170. For example, each of a device 110, an electric lock 120, and the device management server 160 has a wireless communication device that performs communication using a commercial cell phone network, and an example illustrating a configuration or the like may be considered with which the device 110 and the electric lock 120 communicate with the device management server 160 using the commercial cell phone network.

(3) In the embodiment, the in-home-presence probability calculation system 100 is an example illustrating a configuration with which a device 110 transmits the content of an operation performed for the device 110 to the device management server 160. However, as long as the content of an operation performed for the device 110 may be transmitted to the device management server 160, the configuration is not limited to a configuration with which the device 110, for which an operation has been performed, transmits the content of the operation to the device management server 160 by itself. For example, a sound detection sensor including a sound collector microphone is arranged in a home 150. Examples are considered illustrating a configuration with which the sound detection sensor detects a change in sound when an operation is performed for a device 110 (for example, in the case where the device 110 is a dryer, an air blowing sound that newly occurs when the main power switch of the dryer is turned on, an air blowing sound that stops when the main power switch of the dryer is turned off, and the like), specify the content of the operation performed for the device 110 in accordance with the change in the detected sound, and transmits the content of the specified operation to the device management server 160.

(4) In the embodiment, the in-home-presence probability calculation system 100 is an example illustrating a configuration with which, in processing in steps S2030 and S2040 of the in-home-presence probability calculation process, an in-home-presence probability for a specified date and time is calculated using a cumulative histogram having the smallest variance. However, as long as an in-home-presence probability for a specified time may be calculated using at least one cumulative histogram, the number of cumulative histograms to be used is not limited to one and may also be more than one. For example, examples may be considered illustrating a configuration with which in-home-presence probabilities are provisionally calculated using a plurality of cumulative histograms whose variances are smaller than a certain value, an average is further calculated by weighing the calculated provisional in-home-presence probabilities, and the calculated average is treated as a final in-home-presence probability, and the like.

(5) In the embodiment, the in-home-presence probability calculation system 100 is an example illustrating a configuration with which an electric lock 120 determines that a certain operation has been performed by a user with which it is expected that the user has left home from indoors to outdoors. However, as long as it may be determined that a certain operation with which it is expected that the user has left home from indoors to outdoors has been performed for an electric lock 120, the configuration is not limited to a configuration with which the electric lock 120 makes such a determination. For example, examples may be considered illustrating a configuration with which the device management server 160 makes such a determination, and the like. An example of this configuration is realized by, for example, every time some type of operation is performed for an electric lock 120 by a user, transmitting the content of the operation and the time at which the operation has been performed to the device management server 160 and by performing a process similar to the leaving-home coming-home detection process, the process being performed by the device management server 160 using the content of the operation and the time at which the operation has been performed, the content of the operation and the time being transmitted from the electric lock 120.

(6) In the embodiment, the in-home-presence probability calculation system 100 is an example illustrating a configuration with which a certain operation is an operation for turning off the main power switch. In contrast to this, as another example, a configuration and the like may be considered with which a certain operation is any of operations for turning off the main power switch other than an operation for turning off the main power switch performed as a result of execution of a prescheduled operation.

There is a possibility that an operation for turning off the main power switch performed as a result of execution of a prescheduled operation may be performed even when no one is at home. Thus, the accuracy of an in-home-presence probability to be calculated may be increased by excluding this operation from certain operations.

(7) In the embodiment, the in-home-presence probability calculation system 100 is an example illustrating a configuration with which a histogram having a variance less than or equal to the certain value is specified as a correlation histogram in processing in steps S1920 and S1930 in the cumulative histogram creation process. In contrast to this, as another example, a configuration and the like may be considered with which the device management server 160 prestores a model histogram to be used as a model case for correlation histograms and specifies a histogram similar to the model histogram as a correlation histogram.

(8) In the embodiment, the in-home-presence probability calculation system 100 has been described as a system to be used when a delivery company performs delivery operations. However, as long as an in-home-presence probability that a user is at home is used, a user of the in-home-presence probability calculation system 100 is not limited to a delivery company and may also be a person, a company, a system, and the like. For example, examples may be considered such as an example in which a door-to-door selling company that sells products in a face-to-face manner (for example, household medicine distributors) is a user of the in-home-presence probability calculation system 100.

(9) The embodiment and the modified examples described above may also be used in a certain combination.

(10) In the following, furthermore, configurations, modified examples, and effects of an in-home-presence probability calculation method, a server apparatus, and an in-home-presence probability calculation system according to an embodiment of the present disclosure will be described.

(a) An in-home-presence probability calculation method according to an embodiment of the present disclosure is an in-home-presence probability calculation method used in an in-home-presence probability calculation system that provides information as to whether or not a person is at home. The in-home-presence probability calculation method includes receiving operation information on a device arranged in a home via a network every time a certain operation is performed for the device, specifying operation times at which the certain operation has been performed, in accordance with the received operation information, receiving, every time a state is entered in which it is expected that no one is at home, time information of a time at which the state has been entered, specifying in-home-absence times at which a state has been entered in which it is expected that no one is at home, in accordance with the received time information, specifying a correlation between a set including the specified operation times and a set including the specified in-home-absence times, receiving specification of a time from a device that uses the in-home-presence probability calculation system, calculating, when a specified operation time among the specified operation times is a time within a period of a certain time ending at the time at which the specification has been received, a probability that a person is at home at the specified time on the basis of the specified operation time and the specified correlation, and outputting the information as to whether or not a person is at home to the device that uses the in-home-presence probability calculation system on the basis of the calculated probability.

Examples of the home are, for example, houses, apartments, offices, stores, and the like.

According to the in-home-presence probability calculation method according to the embodiment of the present disclosure, in the case where a certain operation has been performed for a device within a period of a certain time ending at the time at which specification of a time has been performed, a behavior pattern after a person who is at home has performed the certain operation until the person leaves home in the past may be reflected and the in-home-presence probability for the specified time may be calculated. As a result, there is a possibility that more accurate information may be provided as to whether or not a person is at home at a specified time.

(b) In addition, in the in-home-presence probability calculation method according to the embodiment of the present disclosure, time differences may be calculated for the specified operation times, each of the time differences being the difference between a corresponding one of the specified operation times and an in-home-absence time that is first specified within a period from the corresponding one of the specified operation times, the period satisfying a certain condition, and the correlation is specified using a frequency distribution of the calculated time differences.

As a result, the cause-and-effect relationship between a certain operation that has been performed and leaving home performed a certain period after performance of the certain operation may tend to be relatively intensely reflected in a specified correlation. As a result, the accuracy of a probability to be calculated may be increased.

(c) In addition, in the in-home-presence probability calculation method according to the embodiment of the present disclosure, the specified correlation may be a cumulative frequency distribution of the time differences.

A cumulative frequency for a certain time difference indicates a frequency of occurrence of events that a person has already left home within the time difference, that is, a probability that a person has already left home within the time difference. Thus, as a result, it is possible to calculate a probability that a person is at home without performing a relatively complicated calculation.

(d) In addition, in the in-home-presence probability calculation method according to the embodiment of the present disclosure, the certain operation may be an operation for turning off a main power switch of the device arranged in the home.

In general, in relatively many cases, devices that operate using power have a function for turning off the main power switch as a basic function. Thus, as a result, this probability calculation method may be realized using relatively various devices.

(e) In addition, in the in-home-presence probability calculation method according to the embodiment of the present disclosure, the device arranged in the home is one of a plurality of devices arranged in the home and target devices, whose main power switch is are be turned off, may be specified among the plurality of devices, correlations may be specified only for the target devices, a correlation may be specified having a strength that satisfies a certain condition among the specified correlations, and the probability may be calculated using the specified correlation that satisfies the certain condition.

As a result, the accuracy of a probability to be calculated may be increased by setting certain conditions so as to make it possible to use a correlation for a device having a relatively strong cause-and-effect relationship between a certain operation that has been performed and leaving home performed after performance of the certain operation among the plurality of devices.

(f) In addition, in the in-home-presence probability calculation method according to the embodiment of the present disclosure, the certain operation is one of a plurality of certain operations, correlations may be specified for the certain operations, each of the correlations being specified for a corresponding one of the certain operations, a correlation may be specified having a strength that satisfies a certain condition among the specified correlations, and the probability may be calculated using the specified correlation that satisfies the certain condition.

As a result, the accuracy of a probability to be calculated may be increased by setting certain conditions so as to make it possible to use a correlation for a device having a relatively strong cause-and-effect relationship between a certain operation that has been performed and leaving home performed after performance of the certain operation among the plurality of devices.

(g) A server apparatus according to an embodiment of the present disclosure is a server apparatus that provides information as to whether or not a person is at home. The server apparatus includes a first receiving unit that receives operation information on a device arranged in a home via a network every time a certain operation is performed for the device and that receives, every time a state is entered in which it is expected that no one is at home, time information of a time at which the state has been entered, an operation time specification unit that specifies an operation times at which the certain operation has been performed, in accordance with the received operation information, an in-home-absence time specification unit that specifies in-home-absence times at which a state has been entered in which it is expected that no one is at home, in accordance with the received time information, a correlation specification unit that specifies a correlation between a set including the specified operation times by the operation time specification unit and a set including the specified in-home-absence times by the in-home-absence time specification unit, a second receiving unit that receives specification of a time from a device that uses the server apparatus and a probability calculation unit that calculates, when a specified operation time among the specified operation times by the operation time specification unit is a time within a period of a certain time ending at the time at which the specification has been received, a probability that a person is at home at the specified time on the basis of the specified operation time and the specified correlation. The information as to whether or not a person is at home is output to the device that uses the server apparatus on the basis of the calculated probability. One of the first receiving unit, the operation time specification unit, the in-home-absence time specification unit, the correlation specification unit, the second receiving unit, and the probability calculation unit includes a processor.

A server apparatus having the above-described characteristics and according to the embodiment of the present disclosure makes it possible to, in the case where a certain operation has been performed for a device within a period of a certain time ending at the time at which specification of a time has been performed, reflect a behavior pattern after a person who is at home has performed the certain operation until the person leaves home in the past and calculate the in-home-presence probability for the specified time. As a result, this server apparatus has a possibility that more accurate information may be provided as to whether or not a person is at home at a specified time.

(h) An in-home-presence probability calculation system according to an embodiment of the present disclosure is an in-home-presence probability calculation system and that provides information as to whether or not a person is at home. The in-home-presence probability calculation system includes a server apparatus. The server apparatus includes a first receiving unit that receives operation information on a device arranged a the home via a network every time a certain operation is performed for the device and that receives, every time a state is entered in which it is expected that no one is at home, time information of a time at which the state has been entered, an operation time specification unit that specifies operation times at which the certain operation has been performed, in accordance with the received operation information, an in-home-absence time specification unit that specifies in-home-absence times at which a state has been entered in which it is expected that no one is at home, in accordance with the received time information, a correlation specification unit that specifies a correlation between a set including the specified operation times by the operation time specification unit and a set including the specified in-home-absence times by the in-home-absence time specification unit, a second receiving unit that receives specification of a time from a device that uses the server apparatus, and a probability calculation unit that calculates, when a specified operation time among the specified operation times by the operation time specification unit is a time within a period of a certain time ending at the time at which the specification has been received, a probability that a person is at home at the specified time on the basis of the specified operation time and the specified correlation. The information as to whether or not a person is at home is output to the device that uses the server apparatus on the basis of the calculated probability. One of the first receiving unit, the operation time specification unit, the in-home-absence time specification unit, the correlation specification unit, the second receiving unit, and the probability calculation unit includes a processor.

An in-home-presence probability calculation system having the above-described characteristics and according to the embodiment of the present disclosure makes it possible to, in the case where a certain operation has been performed for a device within a period of a certain time ending at the time at which specification of a time has been performed, reflect a behavior pattern after a person who is at home has performed the certain operation until the person leaves home in the past and calculate the in-home-presence probability for the specified time. As a result, this probability calculation system has a probability that the accuracy of an in-home-presence probability to be calculated is increased more than that of a conventional probability calculation system that may provide more accurate information as to whether or not a person is at home at a specified time.

The present disclosure is effective in an in-home-presence probability calculation method, a server apparatus, and an in-home-presence probability calculation system for calculating a probability that a person is at home.

What is claimed is:

1. A device management method used in a server apparatus that manages, via a network, a plurality of devices provided in a home, the method comprising:
   receiving operation information on one of a plurality of devices in the home, via the network, every time a certain operation is performed for the one of the plurality of devices;
   for each of the plurality of devices, specifying operation times at which the certain operation has been performed, in accordance with the received operation information;
   receiving, every time a state is entered in which it is expected that no one is at home, time information of a time at which the state has been entered;
   specifying in-home-absence times at which a state has been entered in which it is expected that no one is at home, in accordance with the received time information;
   for each of the plurality of devices, calculating time differences for the specified operation times, each of the time differences being a difference between a corresponding one of the specified operation times and an in-home-absence time that is first specified within a predetermined period from the corresponding one of the specified operation times; and
   for each of the plurality of devices, specifying the performed certain operation as a behavior pattern of the person correlated to a behavior when the person continues being at the home when a ratio of a frequency of the calculated time differences regarding the corresponding one of the plurality of devices, each of which is lower than a particular threshold value, is equal to or lower than an other threshold value.

2. The device management method according to claim 1, wherein the certain operation, performed with respect to one of the plurality of devices, is an operation for turning off a main power switch of the one of the plurality of devices provided in the home.

3. The device management method according to claim 1, wherein the home is a house, a room in an apartment, an office or a store.

4. The device management method according to claim 1, further comprising: for each of the plurality of devices, specifying the performed certain operation, performed with respect to one of the plurality of devices, as a defined behavior pattern of the person correlated to a behavior before the person leaves the home, when a variation of the calculated time differences of the corresponding one of the plurality of devices is equal to or lower than a defined threshold value.

5. The device management method according to claim 4, further comprising:
   receiving specification of a time from a device that a user uses;
   calculating a probability that a person is at home at the specified time on the basis of the defined behavior pattern when a specified operation time is a time within a period of a certain time ending at the time at which the specification has been received,
   wherein the specified operation time is one of the specified operation times of the one of the plurality of devices for which the certain operation is specified as the first defined behavior pattern.

6. A server apparatus that manages, via a network, a plurality of devices arranged in a home, the server apparatus comprising:
   one or more memories; and
   circuitry which, in operation,
   receives operation information on one of a plurality of devices in the home via the network every time a certain operation is performed for the one of the plurality of devices;
   for each of the plurality of devices, specifies operation times at which the certain operation has been performed, in accordance with the received operation information;
   receives, every time a state is entered in which it is expected that no one is at home, time information of a time at which the state has been entered;
   specifies in-home-absence times at which a state has been entered in which it is expected that no one is at home, in accordance with the received time information;
   for each of the plurality of devices, calculates time differences for the specified operation times, each of the time differences being a difference between a corresponding one of the specified operation times and an in-home-absence time that is first specified within a predetermined period from the corresponding one of the specified operation times; and
   for each of the plurality of devices, specifying the performed certain operation as a behavior pattern of the person correlated to a behavior when the person continues being at the home when a ratio of a frequency of the calculated time differences regarding the corresponding one of the plurality of devices, each of which is lower than a particular threshold value, is equal to or lower than an other threshold value.

7. The server apparatus according to claim 6, further comprising: for each of the plurality of devices, specifies the performed certain operation, performed with respect to one of the plurality of devices, as a defined behavior pattern of the person correlated to a behavior before the person leaves the home, when a variation of the calculated time differences of the corresponding one of the plurality of devices is equal to or lower than a defined threshold value.

8. The server apparatus according to claim 7, further comprising:
   receiving specification of a time from a device that a user uses;
   calculating a probability that a person is at home at the specified time on the basis of the defined behavior pattern when a specified operation time is a time within a period of a certain time ending at the time at which the specification has been received,
   wherein the specified operation time is one of the specified operation times of the one of the plurality of devices for which the certain operation is specified as the defined behavior pattern.

9. The server apparatus according to claim 6, wherein the certain operation, performed with respect to one of the plurality of devices, is an operation for turning off a main power switch of the one of the plurality of devices provided in the home.

10. The server apparatus according to claim 6,
wherein the home is a house, a room in an apartment, an office or a store.

\* \* \* \* \*